(12) United States Patent
Shellhammer et al.

(10) Patent No.: US 12,550,143 B2
(45) Date of Patent: Feb. 10, 2026

(54) DISTRIBUTED RESOURCE UNIT SIGNALING

(71) Applicant: QUALCOMM Incorporated, San Diego, CA (US)

(72) Inventors: Stephen Jay Shellhammer, Ramona, CA (US); Lin Yang, San Diego, CA (US); Yanjun Sun, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1072 days.

(21) Appl. No.: 17/390,850

(22) Filed: Jul. 30, 2021

(65) Prior Publication Data

US 2023/0035113 A1 Feb. 2, 2023

(51) Int. Cl.
*H04W 72/20* (2023.01)

(52) U.S. Cl.
CPC .................................. *H04W 72/20* (2023.01)

(58) Field of Classification Search
None
See application file for complete search history.

(56) References Cited

U.S. PATENT DOCUMENTS

| | | |
|---|---|---|
| 2018/0205519 A1 | 7/2018 | Vermani et al. |
| 2019/0007977 A1 | 1/2019 | Asterjadhi et al. |
| 2020/0014509 A1* | 1/2020 | Asterjadhi ............ H04L 5/0041 |
| 2020/0014576 A1* | 1/2020 | Cherian ................. H04L 1/0026 |
| 2020/0344801 A1* | 10/2020 | Epstein ............. H04W 72/0453 |
| 2021/0143955 A1* | 5/2021 | Yang .................. H04W 72/1263 |
| 2021/0392661 A1* | 12/2021 | Cao .................... H04W 72/0453 |
| 2022/0407644 A1* | 12/2022 | Cao ........................ H04L 5/0007 |
| 2022/0408462 A1* | 12/2022 | Cao ........................ H04L 5/0094 |

OTHER PUBLICATIONS

International Search Report and Written Opinion—PCT/US2022/037915—ISA/EPO—Nov. 29, 2022 (2106105WO).

\* cited by examiner

*Primary Examiner* — Srinivasa R Reddivalam
(74) *Attorney, Agent, or Firm* — Holland & Hart LLP

(57) ABSTRACT

This disclosure provides methods, devices and systems for increasing the transmit power of wireless communication devices operating on power spectral density (PSD)-limited wireless channels. Some implementations more specifically relate to signaling in a trigger frame to support distributed transmissions via distributed resource units (dRUs). In some implementations, an access point (AP) may transmit a trigger frame soliciting a trigger-based (TB) physical layer convergence protocol (PLCP) protocol data unit (PPDU) from a wireless station (STA), where the trigger frame carries RU allocation information identifying a distributed resource unit (dRU) allocated for the STA and carries tone mapping information indicating a selected spreading bandwidth design for the wireless channel or subchannel. The AP can support channel puncturing by selecting a particular spreading bandwidth design that controls how dRUs are mapped to non-contiguous tones spanning respective spreading bandwidths.

30 Claims, 24 Drawing Sheets

OPTIONS FOR ONE-BIT SIGNALING FIELDS — 1210

| 1212 | FIRST VALUE: | CONTIGUOUS TONE MAPPING (rRU) |
|---|---|---|
| 1214 | SECOND VALUE: | DISTRIBUTED TONE MAPPING WITH A SPREADING BANDWIDTH DESIGN THAT INCLUDES A SINGLE 80 MHZ SPREADING BANDWIDTH |

*Figure 12A*

OPTIONS FOR TWO-BIT SIGNALING FIELDS — 1220

| 1222 | FIRST VALUE: | CONTIGUOUS TONE MAPPING (rRU) |
|---|---|---|
| 1224 | SECOND VALUE: | DISTRIBUTED TONE MAPPING WITH A SPREADING BANDWIDTH DESIGN THAT INCLUDES A SINGLE 80 MHZ SPREADING BANDWIDTH |
| 1226 | THIRD VALUE: | DISTRIBUTED TONE MAPPING WITH A SPREADING BANDWIDTH DESIGN THAT INCLUDES A SINGLE 40 MHZ SPREADING BANDWIDTH |

*Figure 12B*

1230 — OPTIONS FOR THREE-BIT SIGNALING FIELDS

| | | |
|---|---|---|
| 1232 | FIRST VALUE: | CONTIGUOUS TONE MAPPING (rRU) |
| 1234 | SECOND VALUE: | DISTRIBUTED TONE MAPPING WITH A SPREADING BANDWIDTH DESIGN THAT INCLUDES A SINGLE 80 MHZ SPREADING BANDWIDTH |
| 1236 | THIRD VALUE: | DISTRIBUTED TONE MAPPING WITH A SPREADING BANDWIDTH DESIGN THAT INCLUDES A SINGLE 40 MHZ SPREADING BANDWIDTH (SUCH AS 40-X OR X-40) |
| 1238 | FOURTH VALUE: | DISTRIBUTED TONE MAPPING WITH A SPREADING BANDWIDTH DESIGN THAT INCLUDES A 20 MHZ SPREADING BANDWIDTH IN LOWER 40 MHZ AND A 40 MHZ SPREADING BANDWIDTH IN UPPER 40 MHZ (SUCH AS 20-X-40 OR X-20-40) |
| 1242 | FIFTH VALUE: | DISTRIBUTED TONE MAPPING WITH A SPREADING BANDWIDTH DESIGN THAT INCLUDES A 40 MHZ SPREADING BANDWIDTH IN LOWER 40 MHZ AND A 20 MHZ SPREADING BANDWIDTH IN UPPER 40 MHZ (SUCH AS 40-X-20 OR 40-20-X) |

*Figure 12C*

1240 — OPTIONS FOR 20 MHZ OR 40 MHZ TB PPDUS

| | | |
|---|---|---|
| 1252 | FIRST VALUE: | CONTIGUOUS TONE MAPPING (rRU) |
| 1254 | SECOND VALUE: | DISTRIBUTED TONE MAPPING WITH A SPREADING BANDWIDTH DESIGN THAT INCLUDES A 20 MHZ SPREADING BANDWIDTH |
| 1256 | THIRD VALUE: | DISTRIBUTED TONE MAPPING WITH A SPREADING BANDWIDTH DESIGN THAT INCLUDES A 40 MHZ SPREADING BANDWIDTH |

*Figure 12D*

OPTIONS FOR THREE-BIT SIGNALING FIELDS
(COMBINED TABLE TO SUPPORT 20 MHZ, 40 MHZ, 80 MHZ, 160 MHZ, AND 320 MHZ TB PPDU)

1250

| | |
|---|---|
| 1232 — FIRST VALUE: | CONTIGUOUS TONE MAPPING (rRU) |
| 1234 — SECOND VALUE: | DISTRIBUTED TONE MAPPING WITH A SPREADING BANDWIDTH DESIGN THAT INCLUDES A SINGLE 80 MHZ SPREADING BANDWIDTH |
| 1236 — THIRD VALUE: | DISTRIBUTED TONE MAPPING WITH A SPREADING BANDWIDTH DESIGN THAT INCLUDES A SINGLE 40 MHZ SPREADING BANDWIDTH (SUCH AS 40-X, X-40, OR 40 WITHOUT PUNCTURING) |
| 1238 — FOURTH VALUE: | DISTRIBUTED TONE MAPPING WITH A SPREADING BANDWIDTH DESIGN THAT INCLUDES A 20 MHZ SPREADING BANDWIDTH IN LOWER 40 MHZ AND A 40 MHZ SPREADING BANDWIDTH IN UPPER 40 MHZ (SUCH AS 20-X-40 OR X-20-40) |
| 1242 — FIFTH VALUE: | DISTRIBUTED TONE MAPPING WITH A SPREADING BANDWIDTH DESIGN THAT INCLUDES A 40 MHZ SPREADING BANDWIDTH IN LOWER 40 MHZ AND A 20 MHZ SPREADING BANDWIDTH IN UPPER 40 MHZ (SUCH AS 40-X-20 OR 40-20-X) |
| 1264 — SIXTH VALUE: | DISTRIBUTED TONE MAPPING WITH A SPREADING BANDWIDTH DESIGN THAT INCLUDES A 20 MHZ SPREADING BANDWIDTH |

*Figure 12E*

EXAMPLE COMMON INFORMATION FIELD

| BIT POSITION: | B0-B3 | B4-B15 | B16 | B17 | B18-B19 | B20-B21 | B22 | B23-B25 |
|---|---|---|---|---|---|---|---|---|
| | TRIGGER TYPE | UL LENGTH | MORE TF | CS REQUIRED | UL BW | GI AND HE-LF TYPE | RESERVED | NUMBER OF EHT-LTF SYMBOLS AND MIDAMBLE PERIODICITY |
| # BITS: | 4 | 12 | 1 | 1 | 2 | 2 | 1 | 3 |

| BIT POSITION: | B26 | B27 | B28-B33 | B34-B35 | B36 | B37-B52 | B53 | B54 |
|---|---|---|---|---|---|---|---|---|
| | RESERVED | LDPC EXTRA SYMBOL SEGMENT | AP TX POWER | PRE-FEC PADDING FACTOR | PE DISAMBIGUITY | UL SPATIAL REUSE | DOPPLER | HE/EHT P160 |
| # BITS: | 1 | 1 | 6 | 2 | 1 | 16 | 1 | 1 |

| BIT POSITION: | B55 | B56-B62 | B63 | |
|---|---|---|---|---|
| | SPECIAL USER INFO FIELD PRESENT | RESERVED | RESERVED | TRIGGER DEPENDENT COMMON INFO |
| # BITS: | 1 | 7 | 1 | VARIABLE |

*Figure 15*

DISTRIBUTED RESOURCE UNIT SIGNALING

TECHNICAL FIELD

This disclosure relates generally to wireless communication, and more specifically to signaling for distributed resource units (dRUs) in a wireless communication network.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some instances, APs and STAs may be subject to power spectral density (PSD) limits. For example, some APs and STAs that operate in the 6 gigahertz (GHz) frequency band may be required to conform to a low power indoor (LPI) power class, which limits the transmit power of APs and STAs (in the 6 GHz band) to 5 decibel-milliwatts per megahertz (dBm/MHz) and −1 dBm/MHz, respectively. The transmit power in the 6 GHz band may be PSD-limited on a per-MHz basis. The PSD limits, when applied to contiguous transmissions, can undesirably reduce the range of wireless communications and may impact packet detection by a recipient. The term "contiguous transmission" refers to the transmission of a physical layer convergence protocol (PLCP) protocol data unit (PPDU) on one or more sets of contiguous tones (also referred to as "subcarriers"). The one or more sets of contiguous tones may represent a resource unit (RU) as defined by existing versions of the IEEE 802.11 standard. The existing versions of the IEEE 802.11 standard define RUs based on the quantity and indices of the contiguous tones.

To satisfy the PSD limit, a STA or an AP may transmit a packet as a distributed transmission. The term "distributed transmission" refers to the transmission of a PPDU on noncontiguous tones spanning a wireless channel. As used herein, the term "distributed RU" (or dRU) refers to any RU which has been distributed across a set of noncontiguous subcarrier indices. Thus, a dRU and a traditional RU (as defined by the existing versions of the IEEE 802.11 standard) may be associated with a same amount of bandwidth and may refer to the same quantity of tones, the difference being that a dRU utilizes tones that are noncontiguous while the traditional RU is defined by one or more sets of contiguous tones. A traditional RU (as defined by the existing versions of the IEEE 802.11 standard) may also be referred to as a regular RU (rRU) or a legacy RU, among other examples, to distinguish it from a dRU. The noncontiguous tones of a dRU are distributed throughout a spreading bandwidth (also referred to as a "dRU spreading bandwidth"). Traditionally, the spreading bandwidth is a fixed amount that is equal to the entirety of a frequency spectrum of a wireless channel.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method includes allocating one or more resource units (RUs) of a wireless channel for a trigger-based (TB) physical layer convergence protocol (PLCP) protocol data unit (PPDU) from one or more wireless stations (STAs). The method may include generating a trigger frame that carries RU allocation information indicating the one or more RUs and carries tone mapping information indicating at least a first spreading bandwidth design for one or more distributed RUs (dRUs) in the RU allocation information. The one or more dRUs are mapped to respective sets of noncontiguous tones in accordance with the first spreading bandwidth design. The method may include transmitting the trigger frame via the wireless channel.

Another innovative aspect of the subject matter described in this disclosure can be implemented as a wireless communication device for wireless communication. The wireless communication device includes at least one modem and at least one processor. The at least one processor may be configured to allocate one or more RUs of a wireless channel for a TB PPDU from one or more STAs. The at least one processor may be configured to generate a trigger frame that carries RU allocation information indicating the one or more RUs and carries tone mapping information indicating at least a first spreading bandwidth design for one or more dRUs in the RU allocation information. The one or more dRUs mapped to respective sets of noncontiguous tones in accordance with the first spreading bandwidth design. The at least one modem configured to output the trigger frame for transmission via the wireless channel.

Another innovative aspect of the subject matter described in this disclosure can be implemented as a method for wireless communication by a first STA. The method includes receiving, from an access point, a trigger frame soliciting a TB PPDU from one or more STAs. The trigger frame carries RU allocation information and carries tone mapping information indicating at least a first spreading bandwidth design for one or more dRUs in the RU allocation information. The method includes identifying a first dRU in the RU allocation information that is allocated for the first STA. The first dRU may be associated with a first spreading bandwidth in accordance with the first spreading bandwidth design. The method includes mapping the first dRU to a number (N) of noncontiguous tones spanning the first spreading bandwidth. The method includes transmitting the TB PPDU via the wireless channel as a distributed transmission over the N noncontiguous tones.

Another innovative aspect of the subject matter described in this disclosure can be implemented as a wireless communication device of a first STA. The wireless communication device includes at least one modem and at least one processor communicatively coupled with the at least one modem. The at least one modem may be configured to obtain, from an access point, a trigger frame soliciting a TB PPDU from one or more STAs. The trigger frame carries RU allocation information and carries tone mapping information indicating at least a first spreading bandwidth design for one or more dRUs in the RU allocation information. The at least one processor may be configured to identify a first dRU in the RU allocation information that is allocated for the first STA. The first dRU may be associated with a first spreading bandwidth in accordance with the first spreading bandwidth design. The at least one processor may be configured to map the first dRU to a number (N) of noncontiguous tones spanning the first spreading bandwidth. The at least one modem may be configured to output the TB PPDU for a distributed transmission over the N noncontiguous tones of the wireless channel.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 12A shows example options for signaling tone mapping information in one-bit signaling fields according to some implementations.

FIG. 12B shows example options for signaling tone mapping information in two-bit signaling fields according to some implementations.

FIG. 12C shows example options for signaling tone mapping information in three-bit signaling fields according to some implementations.

FIG. 12D shows example options for signaling tone mapping information and may be used with a 20 MHz bandwidth or 40 MHz bandwidth TB PPDU according to some implementations.

FIG. 12E shows example options for signaling tone mapping information in three-bit signaling fields based on a combined table for multiple sizes of TB PPDU according to some implementations.

FIG. 15 shows a common information field for a trigger frame formatted according to some implementations.

Like reference numbers and designations in the various drawings indicate like elements.

DETAILED DESCRIPTION

Figure 1:
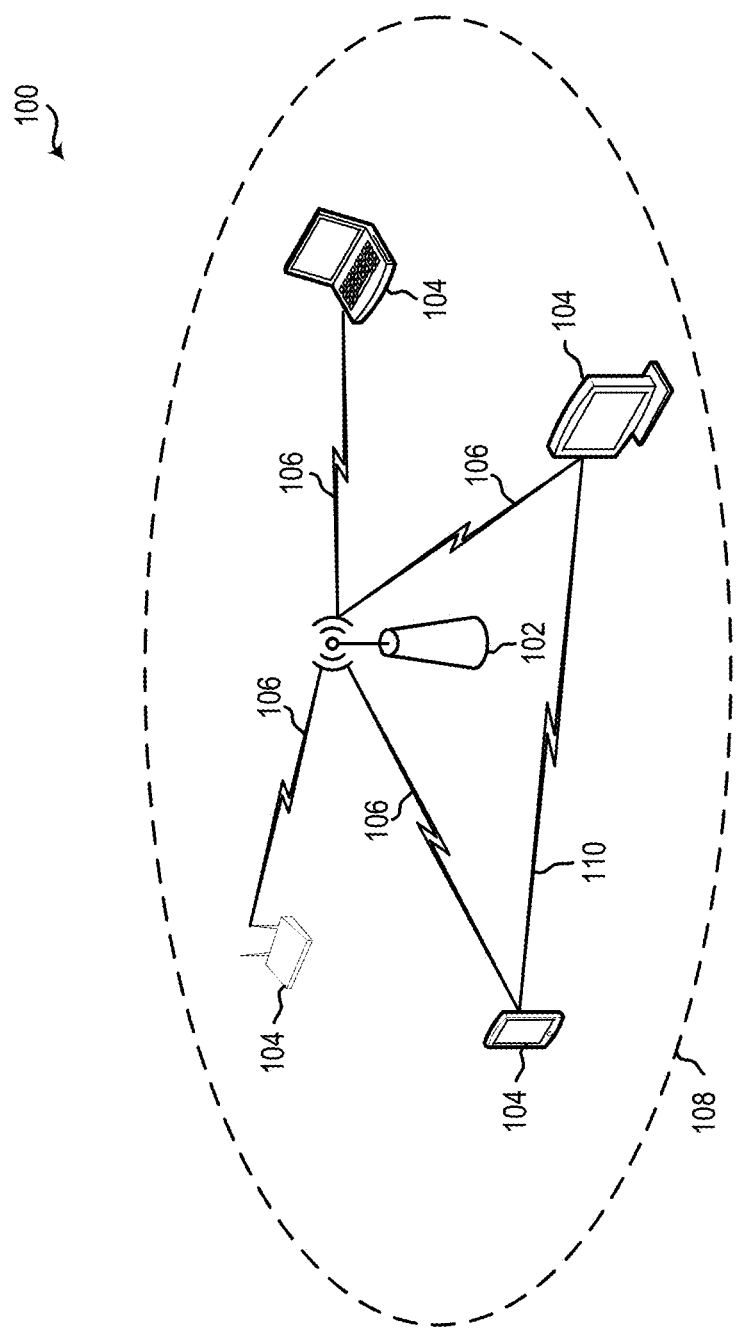
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to resource unit (RU) signaling in a trigger frame from an access point (AP) to one or more wireless stations (STAs), and more particularly, to a trigger frame that carries RU allocation information and tone mapping information indicating that the RU allocation information includes distributed resource units (dRUs) associated with a spreading bandwidth design. The trigger frame is transmitted by the AP to cause the one or more STAs to transmit a trigger-based (TB) physical layer convergence protocol (PLCP) protocol data unit (PPDU) to the AP via respective RUs as an OFDMA transmission. In various implementations, the tone mapping information may be included in a common information field, a special user information field, a new special user information field, a per-user user information field, or a combination of fields within the trigger frame. The tone mapping information may indicate whether the RUs allocated in each subchannel are regular RUs (rRUs) or dRUs, and may further indicate a spreading bandwidth design for a subchannel having dRUs. A spreading bandwidth design may refer to one or more spreading bandwidths within a wireless channel or subchannel and may generally control how allocated dRUs are mapped to noncontiguous tones spanning their respective spreading bandwidths. In some implementations, the AP can support channel puncturing by indicating a particular spreading bandwidth design for the wireless channel or subchannel. In some implementations, the tone mapping information may explicitly indicate the spreading bandwidth design for various subchannels. For example, the tone mapping information may include a signaling field for each 80 MHz subchannel of a wireless channel to indicate the spreading bandwidths of the dRUs in that 80 MHz subchannel. In some other implementations, the tone mapping information may include puncturing information and PPDU bandwidth information associated with the TB PPDU to implicitly indicate the spreading bandwidth design for various subchannels.

Particular implementations of the subject matter described in this disclosure can be implemented to realize one or more of the following potential advantages. Absent the techniques in this disclosure, a dRU would be spread over a wireless channel without regard to puncturing and the puncturing would reduce the quantity of usable tones for a dRU. Using the techniques in this disclosure, an AP can indicate spreading bandwidths of various dRUs to accommodate puncturing in a wireless channel. Allocated dRUs can be spread over a spreading bandwidth that is less than the channel bandwidth without sacrificing the quantity of usable tones that remain after puncturing. In some implementations, the techniques in this disclosure can eliminate or minimize the quantity of bits needed for tone mapping information to indicate the spreading bandwidth design for a wireless channel or subchannel. Thus, in some implementations, the tone mapping information may add little to no additional overhead to the existing frame format of a trigger frame.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11 ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
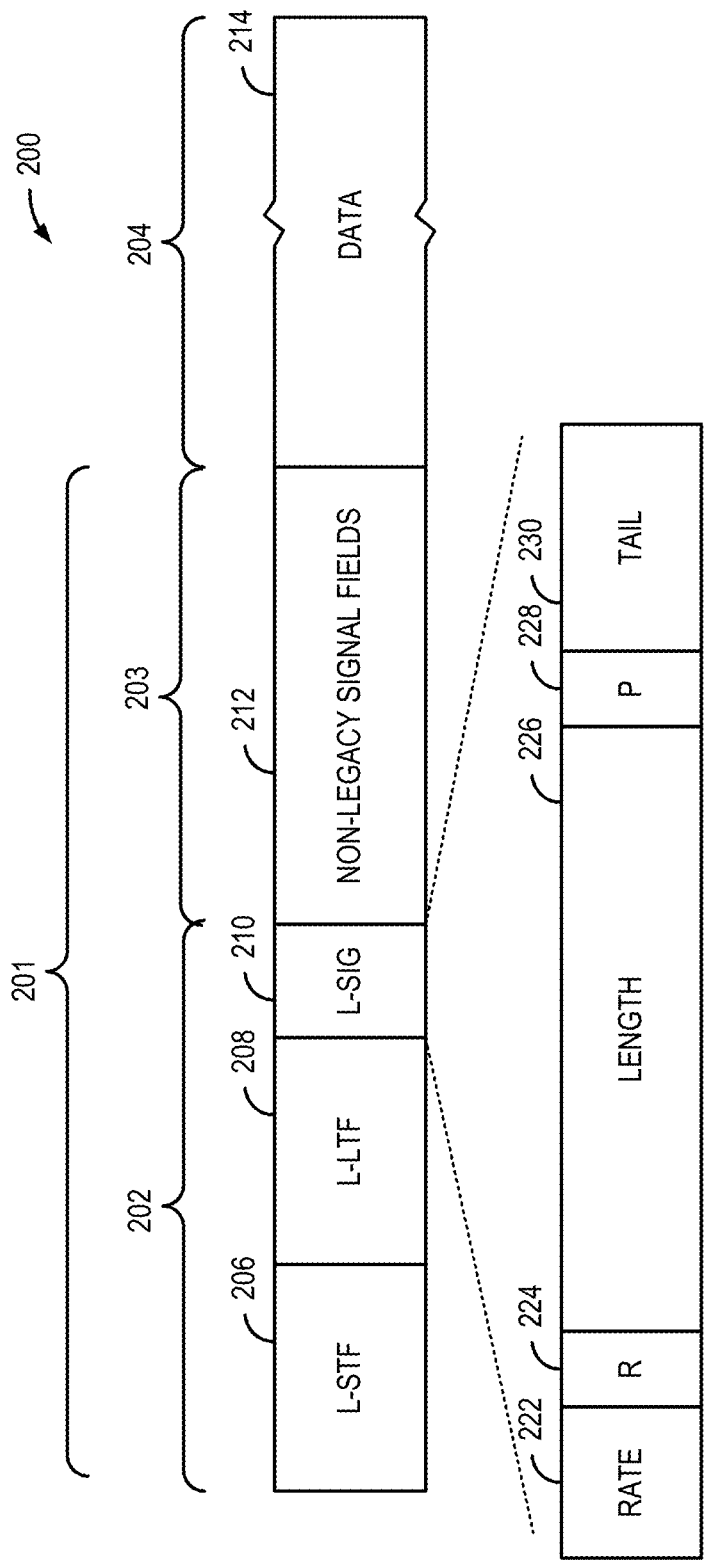
FIG. 2 shows an example physical layer convergence protocol (PLCP) protocol data unit (PPDU) usable for communications between an access point (AP) and a number of stations (STAs).

FIG. 2 shows an example PPDU) 200 usable for wireless communication between an AP and a number of STAs. As shown, the PPDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a specification.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PPDU and to use the determined duration to avoid transmitting on top of the PPDU. For example, the L-STF 206, the L-LTF 208 and the L-SIG 210 may be modulated according to a binary phase shift keying (BPSK) modulation scheme. FIG. 2 shows an example L-SIG 210 in the PPDU 200. L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

The preamble 201 may also include a second portion 203 including one or more non-legacy signal fields 212, for example, conforming to an IEEE 802.11 family of standards such as the IEEE 802.11ac, 802.11ax, 802.11be or later generations. In some implementations, the second portion 203 of the preamble 201 may include a repeat of the L-SIG (RL-SIG, not shown) before the non-legacy signal fields 212. To accommodate later generations of the wireless communication specification defined by the IEEE 802.11 family of standards, some of the L-SIG 210 fields (such as the data rate field 222 and length field 226) have been redefined or overloaded with new definitions. For example, the data rate field 222 and the length field 226 may be populated with values to identify a type of non-legacy signal fields 212 that will follow. However, such a solution may not be scalable, and the redefined or overloaded L-SIG fields may become saturated as more generations are developed. As described further in this disclosure, the non-legacy signal fields 212 may include a universal signal field (U-SIG, not shown) that is constructed to indicate a type of PPDU, an indication of the generation (such as a PHY Version Indicator field) of the wireless communication specification associated with the PPDU, a bandwidth setting, puncturing, or any combination thereof.

Following the non-legacy signal fields 212, the PPDU 200 may include a payload 204. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 3:
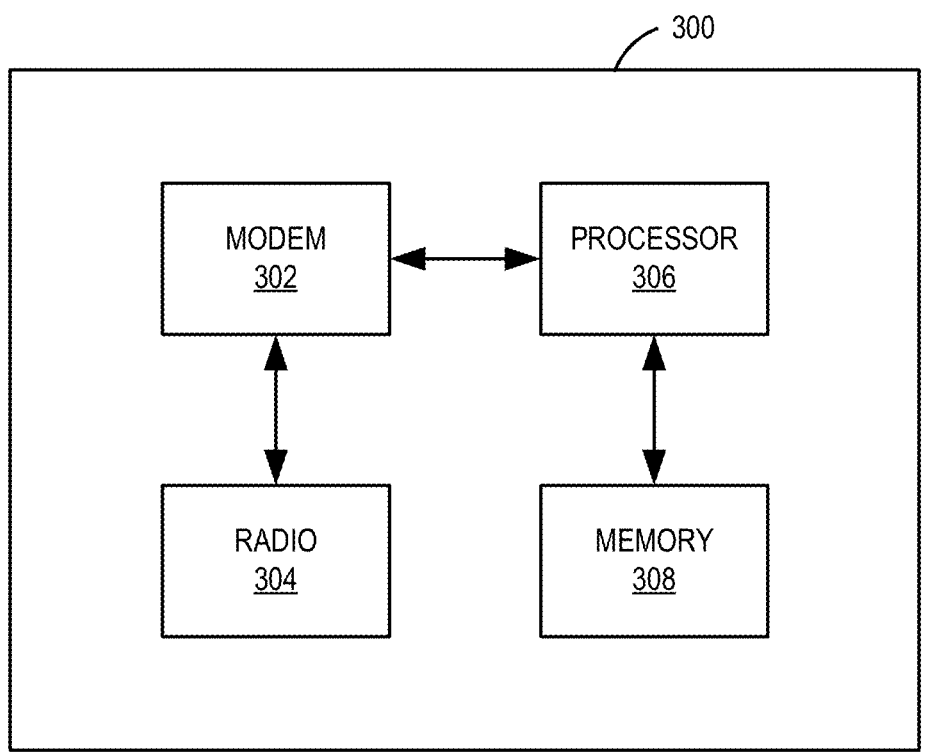
FIG. 3 shows a block diagram of an example wireless communication device.

FIG. 3 shows a block diagram of an example wireless communication device 300. In some implementations, the wireless communication device 300 can be an example of a device for use in a STA such as one of the STAs 104 described with reference to FIG. 1. In some implementations, the wireless communication device 300 can be an example of a device for use in an AP such as the AP 102 described with reference to FIG. 1. The wireless communication device 300 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 300 can be, or can include, a chip, system on chip (SoC), chipset, package or device that includes one or more modems 302, for example, a Wi-Fi (IEEE 802.11 compliant) modem. In some implementations, the one or more modems 302 (collectively "the modem 302") additionally include a WWAN modem (for example, a 3GPP 4G LTE or 5G compliant modem). In some implementations, the wireless communication device 300 also includes one or more radios 304 (collectively "the radio 304"). In some implementations, the wireless communication device 306 further includes one or more processors, processing blocks or processing elements 306 (collectively "the processor 306") and one or more memory blocks or elements 308 (collectively "the memory 308").

The modem 302 can include an intelligent hardware block or device such as, for example, an application-specific integrated circuit (ASIC) among other possibilities. The modem 302 is generally configured to implement a PHY layer. For example, the modem 302 is configured to modulate packets and to output the modulated packets to the radio 304 for transmission over the wireless medium. The modem 302 is similarly configured to obtain modulated packets received by the radio 304 and to demodulate the packets to provide demodulated packets. In addition to a modulator and a demodulator, the modem 302 may further include digital signal processing (DSP) circuitry, automatic gain control (AGC), a coder, a decoder, a multiplexer and a demultiplexer. For example, while in a transmission mode, data obtained from the processor 306 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 304. In implementations involving beamforming, the modulated symbols in the respective spatial streams are precoded via a steering matrix prior to their provision to the IFFT block.

While in a reception mode, digital signals received from the radio 304 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 306) for processing, evaluation or interpretation.

The radio 304 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 300 can include, or be coupled with, multiple transmit antennas (each with a corresponding transmit chain) and multiple receive antennas (each with a corresponding receive chain). The symbols output from the modem 302 are provided to the radio 304, which then transmits the symbols via the coupled antennas. Similarly, symbols received via the antennas are obtained by the radio 304, which then provides the symbols to the modem 302.

The processor 306 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 306 processes information received through the radio 304 and the modem 302, and processes information to be output through the modem 302 and the radio 304 for transmission through the wireless medium. For example, the processor 306 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 306 may generally control the modem 302 to cause the modem to perform various operations described above.

The memory 308 can include tangible storage media such as random-access memory (RAM) or read-only memory (ROM), or combinations thereof. The memory 308 also can store non-transitory processor- or computer-executable software (SW) code containing instructions that, when executed by the processor 306, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 4:
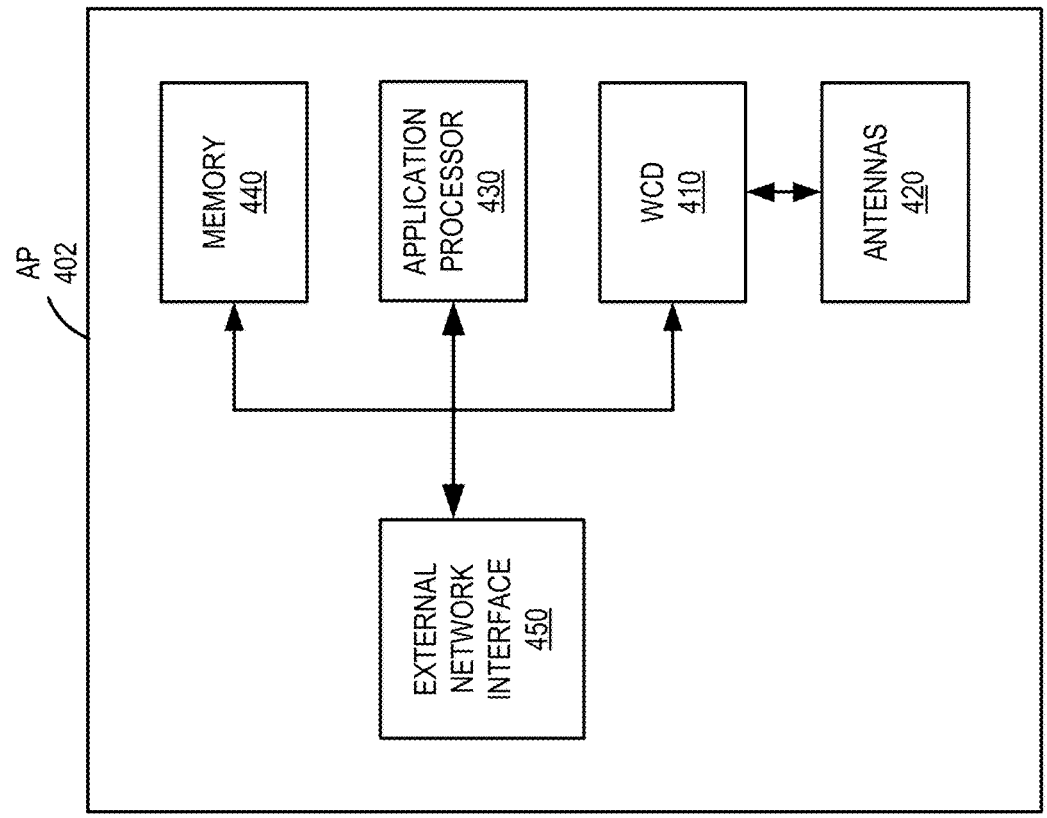
FIG. 4 shows a block diagram of an example AP.

FIG. 4 shows a block diagram of an example AP 402. For example, the AP 402 can be an example implementation of the AP 102 described with reference to FIG. 1. The AP 402 includes a wireless communication device (WCD) 410 (although the AP 402 may itself also be referred to generally as a wireless communication device as used herein). For example, the wireless communication device 410 may be an example implementation of the wireless communication device 300 described with reference to FIG. 3. The AP 402 also includes multiple antennas 420 coupled with the wireless communication device 410 to transmit and receive wireless communications. In some implementations, the AP 402 additionally includes an application processor 430 coupled with the wireless communication device 410, and a memory 440 coupled with the application processor 430. The AP 402 further includes at least one external network interface 450 that enables the AP 402 to communicate with a core network or backhaul network to gain access to external networks including the Internet. For example, the external network interface 450 may include one or both of a wired (for example, Ethernet) network interface and a wireless network interface (such as a WWAN interface). Ones of the aforementioned components can communicate with other ones of the components directly or indirectly, over at least one bus. The AP 402 further includes a housing that encompasses the wireless communication device 410, the application processor 430, the memory 440, and at least portions of the antennas 420 and external network interface 450.

Figure 5:
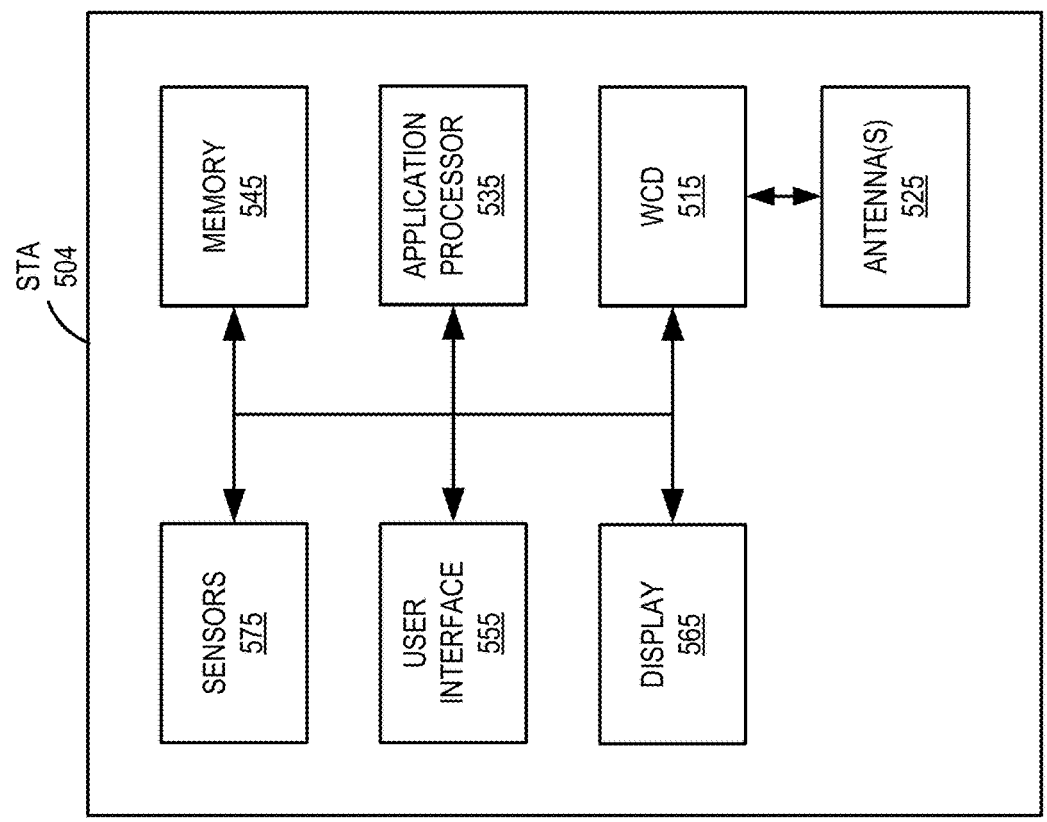
FIG. 5 shows a block diagram of an example STA.

FIG. 5 shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 300 described with reference to FIG. 3. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Figure 6:
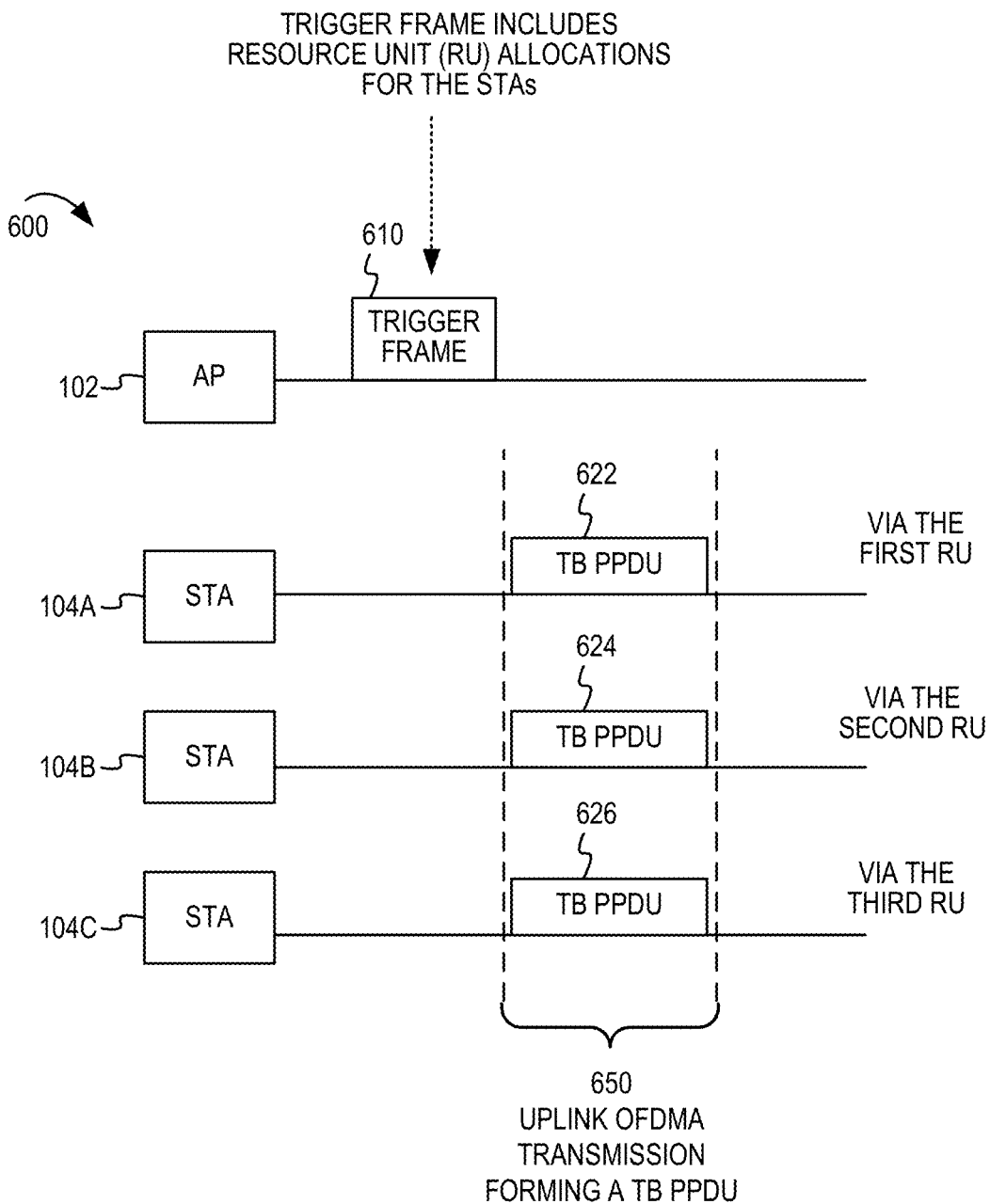
FIG. 6 shows a message flow diagram in which a trigger frame solicits a trigger based (TB) PPDU from a plurality of STAs.

FIG. 6 shows a message flow diagram 600 in which a trigger frame solicits a TB PPDU from a plurality of STAs. The AP 102 and STAs 104 may support orthogonal frequency division multiple access (OFDMA). OFDMA is a communication technology that uses RUs to allocate different resources within a channel bandwidth to one or more users (or groups of users). Each RU may refer to a number (N) of tones (frequency subcarriers). A tone plan may specify subcarrier indices in a frequency spectrum. A "regular RU" (or rRU) refers to a type of RU that maps to contiguous tones in the tone plan. A "distributed RU" (or dRU) refers to a type of RU that maps to noncontiguous tones spanning a spreading bandwidth. Depending on whether an RU is allocated as a rRU or a dRU, the locations of tones for the RU may be contiguous or noncontiguous, respectively. An RU allocation refers to an indication of an RU that has been allocated to a particular STA. Because the AP may allocate a different RU to each STA, the STAs can concurrently communicate in the wireless channel, albeit on different tones corresponding to their respective RU allocation.

The AP 102 may transmit a trigger frame 610 that includes RU allocation information. The RU allocation information in trigger frame 610 may indicate RU allocations for the first STA 104A, the second STA 104B, and the third STA 104C. In the example of FIG. 6, the RU allocation information indicates a first RU allocated to the first STA 104A, a second RU allocated to the second STA 104B, and a third RU allocated to the third STA 104C. The trigger frame 610 instructs the STAs 104A, 104B, and 104C to transmit respective portions 622, 624, and 626 of an uplink OFDMA transmission 650 in accordance with the RU allocation information. The portions 622, 624, and 626 collectively form a TB PPDU from the STAs 104A, 104B, and 104C. In response to the trigger frame 610, the first STA 104A transmits a first portion 622 of the TB PPDU 650 via the first RU, the second STA 104B transmits a second portion 624 of the TB PPDU 650 via the second RU, and the third STA 104C transmits a third portion 626 of the TB PPDU 650 via the third RU.

Figure 7:
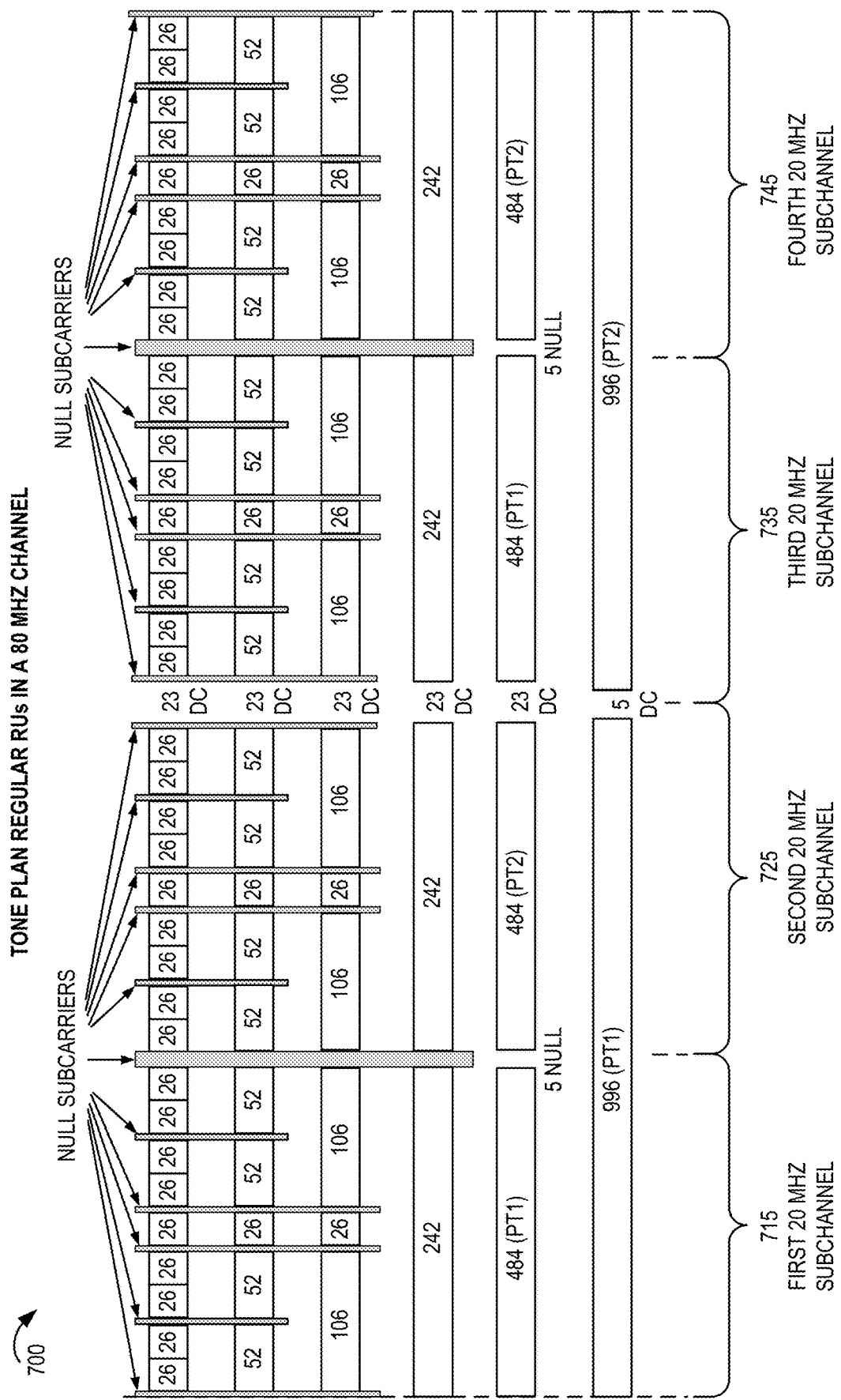
FIG. 7 shows an example tone plan in which regular resource units (rRUs) are defined with contiguous tone mappings for an 80 MHz wireless channel or an 80 MHz subchannel.

FIG. 7 shows an example tone plan 700 in which rRUs are defined with contiguous tone mapping for an 80 MHz wireless channel or an 80 MHz subchannel. The example tone plan 700 is defined for an 80 MHz channel bandwidth that includes four 20 MHz subchannels 715, 725, 735 and 745. In some implementations, the example tone plan 700 for an 80 MHz channel may be duplicated to achieve a higher channel bandwidth (such as 160 MHz, 240 MHz, or 320 MHz bandwidth channels in which each 80 MHz portion implements the example tone plan 700). The example tone plan 700 also may unused subcarriers (such as a guard band, edge tones, DC subcarriers or null subcarriers) that are excluded from rRUs.

The IEEE 802.11 standard defines a number of logical RUs and multiple regular RUs (MRUs) of various sizes. When a logical RU is mapped to contiguous tones or subcarriers it may be referred to as an rRU. The RUs shown in the tone plan 700 are mapped as rRUs. The tone plan 700 shows each potential rRU in the 80 MHz channel as well as some null tones (shown with dotted lines) between the potential RUs. The example tone plan 700 defines rRUs of various sizes. For example, a 242-tone rRU maps to 242 contiguous subcarrier indices spanning a 20 MHz bandwidth. Similarly, a 484+242-tone MRU maps to 484 contiguous subcarrier indices spanning a 40 MHz bandwidth and to 242 contiguous subcarrier indices spanning a 20 MHz bandwidth. As shown in FIG. 7, a total of 996 usable tones are available when the full 80 MHz bandwidth (BW) is allocated as a single rRU. FIG. 7 also shows example 26-tone, 52-tone, 106-tone, 242-tone, and 484-tone rRUs that may be allocated to different users.

An rRU is constructed from one or more sets of contiguous tones. However, in this configuration, the per-tone transmit power of a wireless communication device may be severely limited based on the PSD of the wireless channel. For example, the low power indoor (LPI) power class limits the overall transmit power of APs and STAs to 5 dBm/MHz and −1 dBm/MHz, respectively, in the 6 GHz band. To accommodate the PSD of the wireless channel, a logical RU can be mapped as a dRU in which tones are distributed across a spreading bandwidth. The per-tone transmit power of a logical RU mapped as a dRU can be increased while still satisfying the per-MHz PSD limit.

Figure 8A:
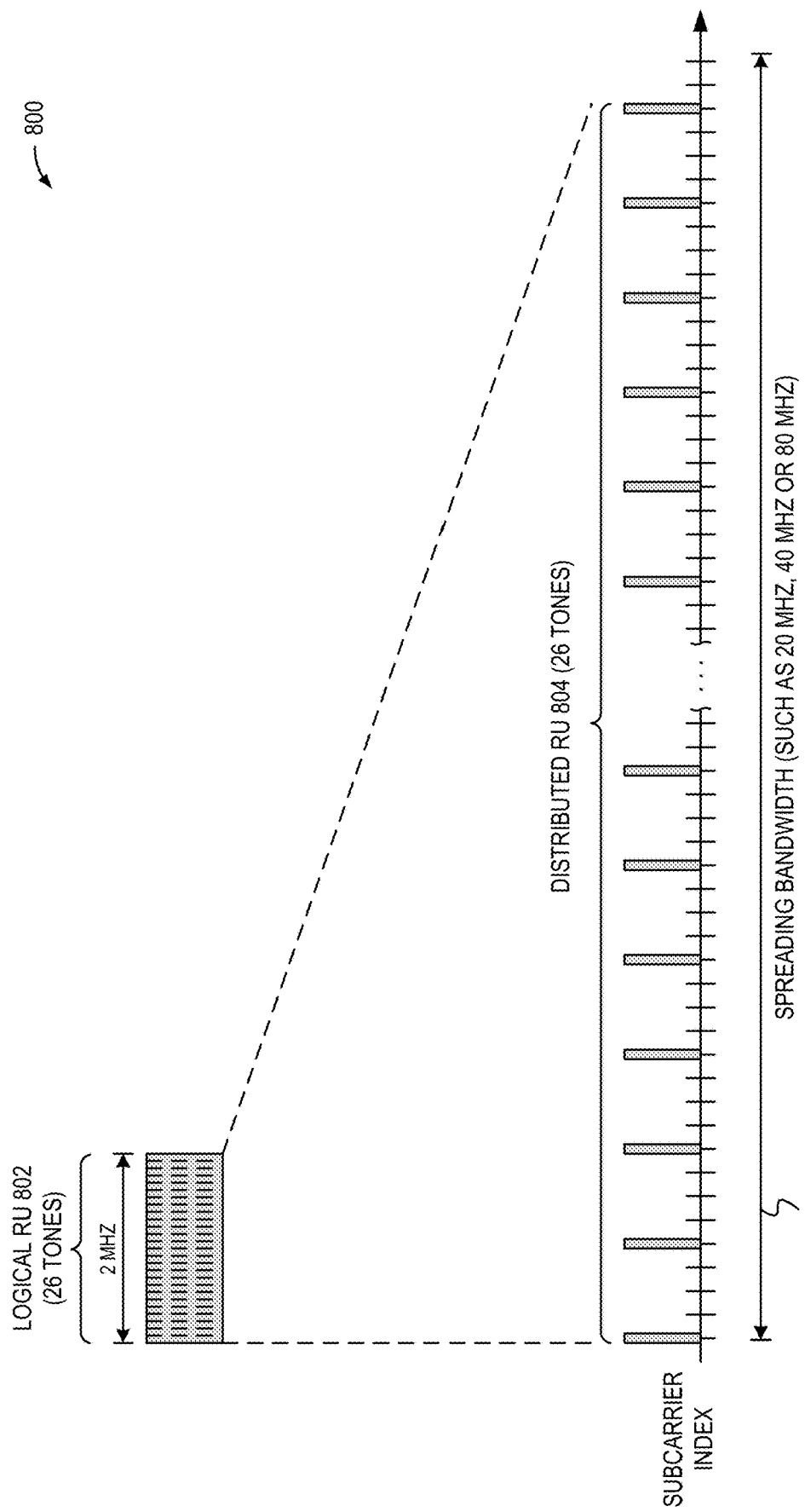
FIG. 8A shows a frequency diagram depicting an example distributed tone mapping for a distributed resource unit (dRU).

FIG. 8A shows a frequency diagram 800 depicting an example distributed tone mapping for a dRU. More specifically, FIG. 8A shows an example mapping of a logical RU 802 to a distributed RU (dRU) 804. The logical RU 802 represents a number of tones or subcarriers that are allocated for the transmission of a PPDU. In contrast, the dRU 804 represents the physical resources (identified by subcarrier indices) that are modulated to transmit a PPDU. As such, the per-tone transmit power of the rRUs is limited by the number of tones mapped to each 1 MHz subchannel of a wireless channel. As shown in FIG. 8A, the logical RU 802 may be mapped to a set of noncontiguous subcarrier indices spanning a spreading bandwidth 852. Generally, when the spreading bandwidth 852 is larger, the per-tone transmit power can be higher.

Each dRU may be associated with a number (N) of noncontiguous tones (such as 26, 52, 52+26, 106, 106+26, 242 or 484 tones). The N noncontiguous tones are distributed throughout a spreading bandwidth (such as 20 MHz (242 usable tones), 40 MHz (484 usable tones), or 80 MHz (996 usable tones)). In the example of FIG. 8A, the logical RU 802 includes 26 tones spanning a spreading bandwidth. When he logical RU 802 is mapped as a rRU (such as in accordance with the tone plan 700 described with reference to FIG. 7) it may include 26 contiguous tones mapped to consecutive subcarrier indices in a contiguous 2 MHz frequency range. FIG. 8A shows the logical RU 802 mapped to a set of noncontiguous subcarrier indices, for example, to construct a dRU 804. The noncontiguous subcarrier indices associated with a particular dRU may be based on a distributed tone plan (not shown) or a tone spreading technique. The tone spreading technique may include a tone mapping distance (DTM) applicable to the group of dRUs that collectively span a portion of the wireless channel. The DTM may indicate a distance or spacing between adjacent tones of each set of non-contiguous tones resulting from the tone spreading. In the example of FIG. 8A, the logical RU 802 is mapped to 26 noncontiguous subcarrier indices spread across a spreading bandwidth 852. In accordance with aspects of this disclosure, the spreading bandwidth 852 (such as 20 MHz, 40 MHz, or 80 MHz) for the dRU 804 may be obtained from a spreading bandwidth design for a wireless channel or subchannel. A trigger frame may include tone mapping information indicating the spreading bandwidth design.

Compared to the tone mapping described above with respect to the legacy tone plan, the distributed tone mapping depicted in FIG. 8A effectively reduces the number of tones (of the logical RU 802) in each 1 MHz subchannel. For example, each of the 26 tones can be mapped to a different 1 MHz frequency range within the spreading bandwidth 852. As a result, each AP or STA implementing the distributed tone mapping of FIG. 8A can maximize its per-tone transmit power within PSD limitation (which may maximize the overall transmit power of the logical RU 802).

In some implementations, a transmitting device (such as a STA) may include a distributed tone mapper that maps the logical RU 802 to the dRU 804 in the frequency domain (such as described with reference to FIG. 8A). The dRU 804 is then converted to a time-domain signal (such as by an inverse fast Fourier transform (IFFT)) for transmission over a wireless channel. A receiving device (such as an AP) receives the time-domain signal over the wireless channel and converts the time-domain signal back to the dRU 804 (such as by a fast Fourier transform (FFT)). In some implementations, the receiving device may include a distributed tone demapper that demaps the dRU 804 to the logical RU 802. In other words, the distributed tone demapper reverses the mapping performed by the distributed tone mapper at the transmitting device. The receiving device can then recover the information carried (or modulated) on the logical RU 802 as a result of the demapping.

In the example of FIG. 8A, the logical RU 802 is distributed evenly across a spreading bandwidth 852. However, in some implementations, the logical RU 802 can be mapped to any suitable pattern of noncontiguous subcarrier indices. For example, in some aspects, the distance between any pair of modulated tones may be less than or greater than the distances depicted in FIG. 8A. In some other aspects, a subset of two or more tones of the logical RU 802 may be mapped to contiguous subcarrier indices. Still further, in some aspects, multiple logical RUs may be mapped to interleaved subcarrier indices of a shared wireless channel.

Figure 8B:
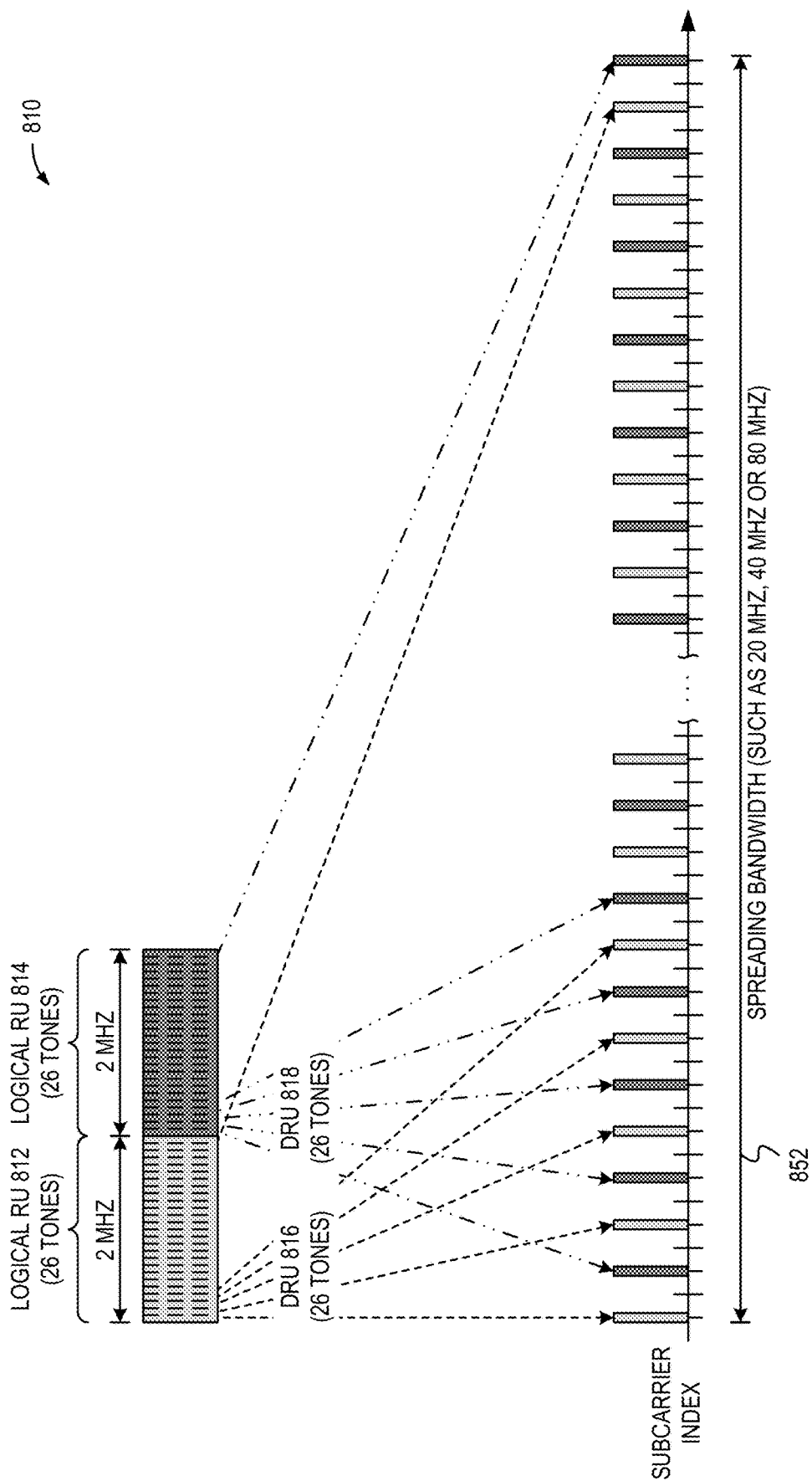
FIG. 8B shows another frequency diagram depicting an example distributed tone mapping with multiple dRUs.

FIG. 8B shows another frequency diagram 810 depicting an example distributed tone mapping with multiple dRUs. More specifically, FIG. 8B shows an example mapping of logical RUs 812 and 814 to dRUs 816 and 818, respectively. In some implementations, an AP may allocate the logical RUs 812 and 814 to first and second STAs, respectively, for the transmission of respective portions of a TB PPDU. In the example of FIG. 8B, each of the logical RUs 812 and 814 includes 26 tones. In some implementations, the logical RUs 812 and 814 are mapped to the dRUs 816 and 818, respectively, across a spreading bandwidth 852 according to a spreading bandwidth design. More specifically, each of the logical RUs 812 and 814 is mapped to a respective set of 26 noncontiguous subcarrier indices spread across the spreading bandwidth 852. Thus, as shown in FIG. 8B, the dRU 816 is interleaved with the dRU 818 across a shared spreading bandwidth 852. Aspects of the present disclosure recognize that, by interleaving the dRUs 816 and 818, the per-tone transmit power of each dRU can be significantly increased without sacrificing spectral efficiency.

A trigger frame may include RU allocation information indicating a logical RU (or MRU) that is allocated for a TB PPDU from a STA. Some formats of the trigger frame may include signaling to indicate whether the RU allocation information is based on contiguous tone mapping (such as for an rRU mapped according to a legacy tone plan) or distributed tone mapping (such as for a dRU mapped according to a tone spreading technique). However, there may be scenarios in which an AP may desire to allocate rRUs in some subchannels and dRUs in other subchannels. Furthermore, the current techniques for distributed tone mapping assume that the spreading bandwidth 852 is always equal to the channel bandwidth without puncture. When puncturing is used, the distributed tone mapping can result in fewer available tones due to exclusion of tones in punctured portions of a wireless channel.

Various aspects relate generally to resource unit (RU) signaling in a trigger frame from an access point (AP) to one or more wireless stations (STAs), and more particularly, to a trigger frame that carries RU allocation information and tone mapping information indicating that the RU allocation information includes distributed resource units (dRUs) associated with a selected spreading bandwidth design. The trigger frame is transmitted by the AP to cause the one or more STAs to transmit a trigger-based (TB) physical layer convergence protocol (PLCP) protocol data unit (PPDU) to the AP via respective RUs as an OFDMA transmission. The tone mapping information can indicate whether the RUs allocated in each subchannel are regular RUs (rRUs) or dRUs. The term "regular RU" (or rRU) refers to a type of RU that maps to contiguous tones in a tone plan. In contrast, a "distributed RU" (dRU) is a type of RU that maps to noncontiguous tones spanning a spreading bandwidth. A spreading bandwidth design may refer to one or more spreading bandwidths within a wireless channel or subchannel and controls how allocated dRUs are mapped to noncontiguous tones spanning their respective spreading bandwidths. The AP can support channel puncturing by indicating a particular spreading bandwidth design for the wireless channel or subchannel. Each dRU may be associated with a number (N) of noncontiguous tones (such as 26, 52, 52+26, 106, 106+26, or 242, 484 tones). The N noncontiguous tones are distributed throughout a spreading bandwidth (such as 20 MHz (242 usable tones), 40 MHz (484 usable tones), or 80 MHz (996 usable tones)). In some implementations, the tone mapping information may explicitly indicate the spreading bandwidth design for various subchannels. For example, the tone mapping information may include a signaling field for each 80 MHz subchannel of a wireless channel to indicate the spreading bandwidths of the dRUs in that 80 MHz subchannel. In some other implementations, the tone mapping information may include puncturing information and PPDU bandwidth information associated with the TB PPDU to implicitly indicate the spreading bandwidth design for various subchannels. In various implementations, the tone mapping information may be included in a common information field, a special user information field, a new special user information field, a per-user user information field, or a combination of fields.

Particular implementations of the subject matter described in this disclosure can be implemented to realize one or more of the following potential advantages. Absent the techniques in this disclosure, a dRU would be spread over a wireless channel without regard to puncturing and the puncturing would reduce the quantity of usable tones for a dRU. Using the techniques in this disclosure, an AP can indicate spreading bandwidths of various dRUs to accommodate puncturing in a wireless channel. Allocated dRUs can be spread over a spreading bandwidth that is less than the channel bandwidth without sacrificing the quantity of usable tones that remain after puncturing. In some implementations, the techniques in this disclosure can eliminate or minimize the quantity of bits needed for tone mapping information to indicate the spreading bandwidth design for a wireless channel or subchannel. Thus, in some implementations, the tone mapping information may not add overhead to existing frame format of a trigger frame.

Figure 9:
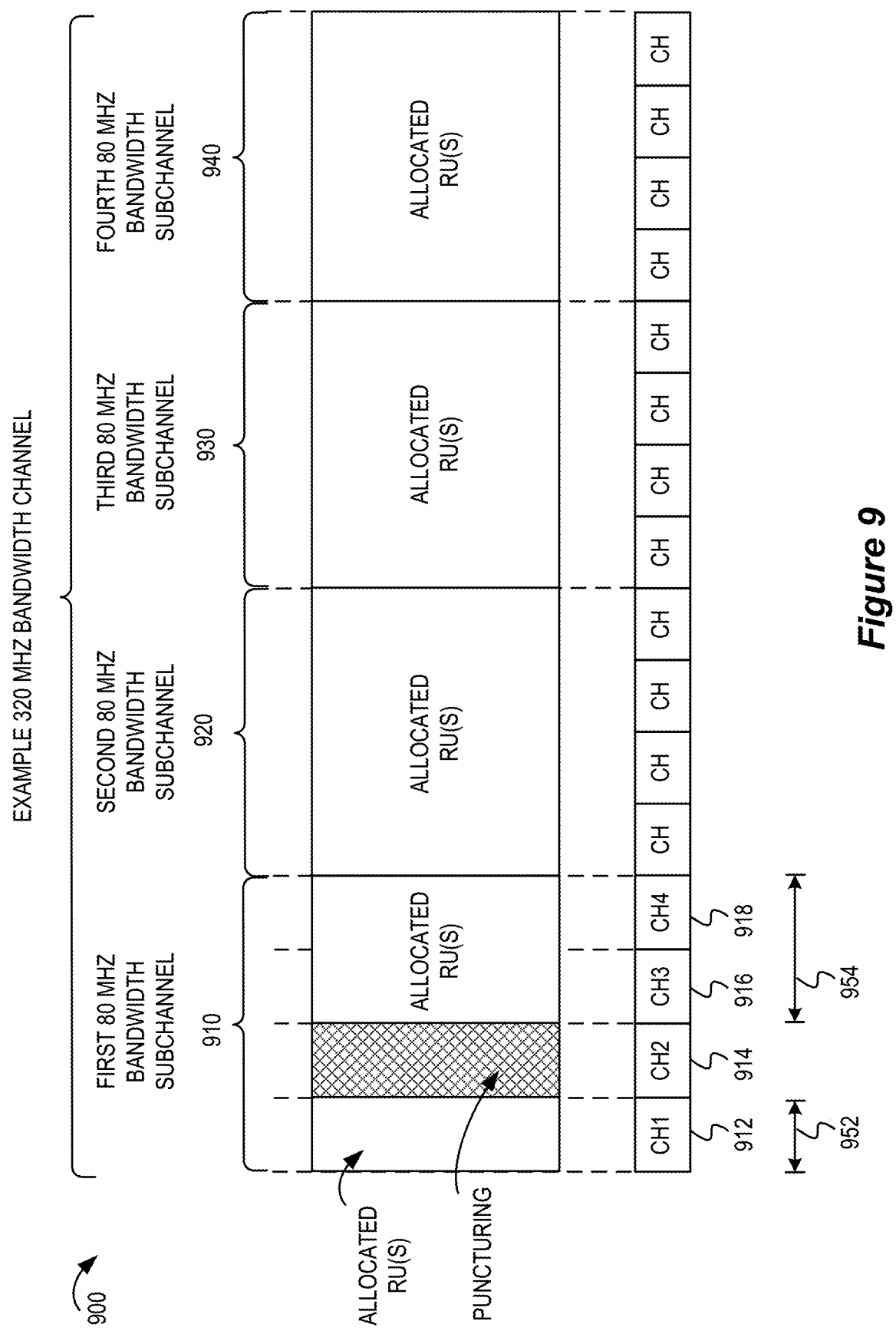
FIG. 9 shows a conceptual diagram illustrating an example wireless channel with RU allocations and puncturing in various subchannels.

FIG. 9 shows a conceptual diagram 900 illustrating an example wireless channel with RU allocations and puncturing in various subchannels. The example wireless channel in FIG. 9 has a 320 MHz total bandwidth in a frequency range associated with a first 80 MHz bandwidth subchannel 910, a second 80 MHz bandwidth subchannel 920, a third 80 MHz bandwidth subchannel 930, and fourth 80 MHz bandwidth subchannel 940. Each 80 MHz bandwidth subchannel may consist of 20 MHz bandwidth subchannels, such as a first 20 MHz bandwidth subchannel 912, a second 20 MHz bandwidth subchannel 914, a third 20 MHz bandwidth subchannel 916 and a fourth 20 MHz bandwidth subchannel 918 in the first 80 MHz bandwidth subchannel 910.

An AP may allocate a various logical RUs in respective 80 MHz bandwidth subchannels 910, 920, 930, and 940. A trigger frame (not shown) may include RU allocation information indicating the logical RUs that are allocated to different STAs. In accordance with aspects of this disclosure, the trigger frame also may indicate and whether the logical RUs in each 80 MHz bandwidth subchannel are rRUs or dRUs. The AP may populate the trigger frame with tone mapping information that indicates, on a per-80 MHz bandwidth subchannel basis, whether the logical RUs allocated for that 80 MHz bandwidth subchannel are rRUs or dRUs. For example, the tone mapping information may indicate that RU allocations for the fourth 80 MHz bandwidth subchannel are for logical RUs mapped on contiguous tones as rRUs within the fourth 80 MHz bandwidth subchannel 940 and may further indicate that other RU allocations for the third 80 MHz bandwidth subchannel 930 are for logical RUs mapped on noncontiguous tones as dRUs within the third 80 MHz bandwidth subchannel 930. The tone mapping information permits a flexible combination of rRUs and dRUs allocated in a wireless channel, albeit on different 80 MHz bandwidth subchannels.

When the RU allocations in a particular 80 MHz bandwidth subchannel are for dRUs, the tone mapping information also may indicate the spreading bandwidth design for that 80 MHz bandwidth subchannel. The spreading bandwidth design may permit puncturing by limiting one or more spreading bandwidths within the 80 MHz bandwidth subchannel. Within an 80 MHz bandwidth subchannel, one or more of the 20 MHz bandwidth subchannels may be punctured to prevent communication on those subchannels. The spreading bandwidth design accommodates puncturing by defining the spreading bandwidth(s) for dRU(s) within the 80 MHz bandwidth subchannel.

In the example shown in FIG. 9, a second 20 MHz bandwidth subchannel 914 is punctured. Meanwhile, the first 20 MHz bandwidth subchannel 912, the third 20 MHz bandwidth subchannel 916 and the fourth 20 MHz bandwidth subchannel 914 remain available for RU allocations. A spreading bandwidth design for the first 80 MHz bandwidth subchannel 910 may indicate a 20 MHz spreading bandwidth (shown as a first spreading bandwidth 952) in the lower 40 MHz bandwidth and a 40 MHz spreading bandwidth (shown as a second spreading bandwidth 954) in the upper 40 MHz bandwidth. Thus, the dRUs allocated in the lower 40 MHz bandwidth may be spread over the first spreading bandwidth 952 that includes the first 20 MHz bandwidth subchannel 912. The dRUs allocated in the upper 40 MHz bandwidth may be spread over the second spreading bandwidth 954 that includes the third 20 MHz bandwidth subchannel 916 and the fourth 20 MHz bandwidth subchannel 918. In some implementations, a dRU may not spread over multiple spreading bandwidths. Alternatively, in some implementations, a dRU may spread over multiple spreading bandwidths within an 80 MHz bandwidth subchannel. For purposes of this disclosure, examples of dRUs and their respective spreading bandwidths are described as a dRU spread over a single spreading bandwidth. However, a spreading bandwidth design can indicate multiple spreading bandwidths associated with respective dRUs within an 80 MHz subchannel.

Figure 10:
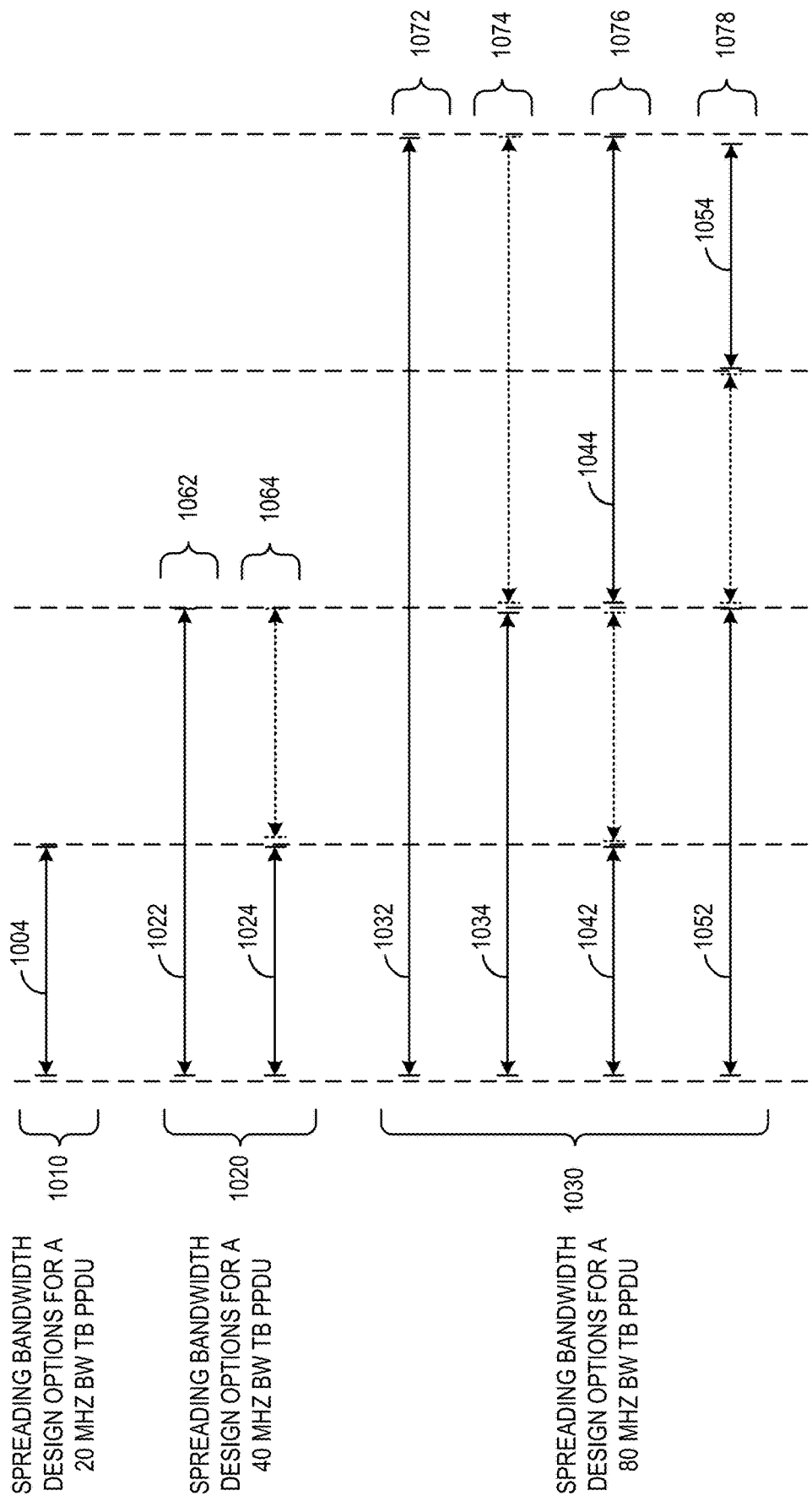
FIG. 10 shows example spreading bandwidth designs according to some implementations.

FIG. 10 shows example spreading bandwidth designs 1000 according to some implementations. The spreading bandwidth design options may depend on a bandwidth of a PPDU bandwidth of the TB PPDU. For example, a 20 MHz BW TB PPDU may only support a 20 MHz bandwidth spreading design 1010 having a single 20 MHz spreading bandwidth 1004.

A 40 MHz BW TB PPDU may support various spreading bandwidth design options 1020. In a first option 1062, the spreading bandwidth design includes a single 40 MHz spreading bandwidth 1022. In a second option 1064, the spreading bandwidth design includes a single 20 MHz spreading bandwidth 1024. The single 20 MHz spreading bandwidth 1024 may be located in a lower 20 MHz portion of the TB PPDU (as shown in FIG. 10) or alternatively may be located in an upper 20 MHz portion of the TB PPDU (shown with a dotted line). The remaining portion of the 40 MHz TB PPDU may be punctured. In some implementations, the location of the single 20 MHz spreading bandwidth 1024 may be determined based on a combination of the tone mapping information and the location of the logical RU in a tone plan as described further with reference to FIG. 13.

An 80 MHz BW TB PPDU may support various spreading bandwidth design options 1030. In a first option 1072, the spreading bandwidth design includes a single 80 MHz spreading bandwidth 1032. In a second option 1074, the spreading bandwidth design includes a single 40 MHz spreading bandwidth 1034. The single 40 MHz spreading bandwidth 1034 may be located in a lower 40 MHz portion of the TB PPDU (as shown in FIG. 10) or may be located in an upper 40 MHz portion of the TB PPDU (shown with a dotted line). When the single 40 MHz spreading bandwidth is located in the lower 40 MHz of the subchannel, the spreading bandwidth design may be referred to as "40-X," where "40" represents the 40 MHz spreading bandwidth and "X" represents a punctured portion of the wireless channel. When the single 40 MHz spreading bandwidth is located in the upper 40 MHz of the subchannel, the spreading bandwidth design may be referred to as "X-40."

In a third option 1076, the spreading bandwidth design includes a first spreading bandwidth 1042 (20 MHz spreading bandwidth) located in a lower 40 MHz portion of the TB PPDU and a second spreading bandwidth 1044 (40 MHz spreading bandwidth) located in an upper 40 MHz portion of the TB PPDU second. As shown in FIG. 10, the location of the first spreading bandwidth 1042 may be in the lower 20 MHz of the lower 40 MHZ portion of the TB PPDU and the spreading bandwidth design may be referred to as "20-X-40." Alternatively, the first spreading bandwidth 1042 may be in the upper 20 MHz of the lower 40 MHz portion of the TB PPDU (shown with a dotted line) and the spreading bandwidth design may be referred to as "X-20-40."

In a fourth option 1078, the spreading bandwidth design includes a first spreading bandwidth 1052 (40 MHz spreading bandwidth) located in a lower 40 MHz portion of the TB PPDU and a second spreading bandwidth 1054 (20 MHz spreading bandwidth) located in an upper 40 MHz portion of the TB PPDU second. As shown in FIG. 10, the location of the second spreading bandwidth 1054 may be in the upper 20 MHz of the upper 40 MHZ portion of the TB PPDU and the spreading bandwidth design may be referred to as "40-X-20." Alternatively, the location of the second spreading bandwidth 1054 may be in the lower 20 MHz of the upper 40 MHz portion of the TB PPDU (shown with a dotted line) and the spreading bandwidth design may be referred to as "40-20-X."

The example spreading bandwidth designs described with reference to FIG. 10 are not intended to be an exhaustive list of all possible spreading bandwidth designs. Rather, the example spreading bandwidth designs are provided for pedagogical purposes. In some implementations, a technical standard may limit the list of possible spreading bandwidth designs for simplicity. The examples of tone mapping information in this disclosure are based on the example spreading bandwidth designs described with reference to FIG. 10. Each option may be indicated as a distinct value in a signaling field. In the instances where a wireless channel is more than 80 MHz bandwidth, a trigger frame may include a separate signaling field for each 80 MHz bandwidth subchannel.

Figure 11:
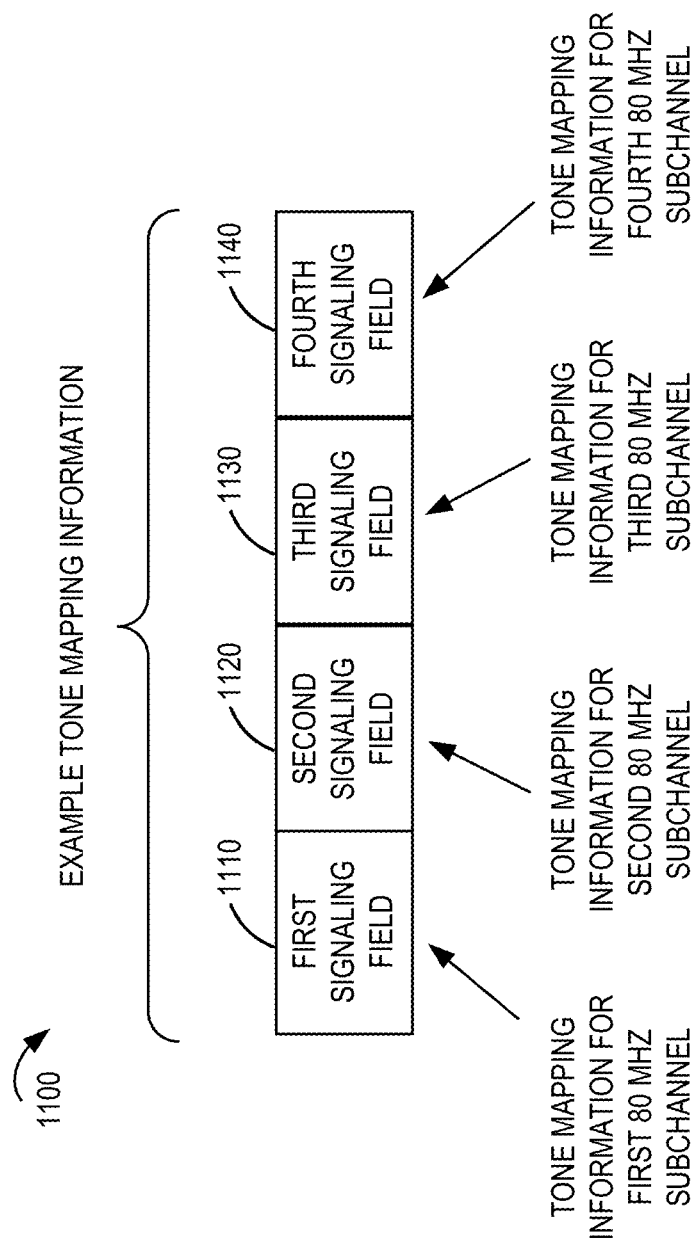
FIG. 11 shows example tone mapping information according to some implementations.

FIG. 11 shows example tone mapping information 1100 according to some implementations. The tone mapping information 1100 may include a plurality of signaling fields that correspond to respective 80 MHz bandwidth subchannels. For example, a first signaling field 1110 may include tone mapping information for a first 80 MHz bandwidth subchannel, a second signaling field 1120 may include tone mapping information for a second 80 MHz bandwidth subchannel, a third signaling field 1130 may include tone mapping information for a third 80 MHz bandwidth subchannel, and a fourth signaling field 1140 may include tone mapping information for a fourth 80 MHz bandwidth subchannel.

The tone mapping information in each signaling field indicates whether the RU allocations for a respective 80 MHz bandwidth subchannel are for rRUs or dRUs. Furthermore, in instances where the RU allocations are for dRUs in a particular 80 MHz bandwidth subchannel, the tone mapping information may indicate the spreading bandwidth design for that 80 MHz bandwidth subchannel. The spreading bandwidth design may define one or more spreading bandwidths within the 80 MHz bandwidth subchannel.

Each signaling field may comprise one or more signaling bits in a trigger frame format. Furthermore, in some implementations, the signaling bits may be interpreted with other fields of the trigger frame to implicitly indicate the spreading bandwidth design for all or part of a TB PPDU. For example, the one or more signaling bits (such as a dRU indication bit) may indicate that RU allocations in an 80 MHz bandwidth subchannel are for dRUs. The spreading bandwidth design may be determined based on a combination of the dRU indication bit, puncturing information, and PPDU bandwidth information for the TB PPDU. Thus, in some implementations, the tone mapping information may include one or more signaling bits in the signaling fields in combination with signaling in other fields. This disclosure includes several options for the quantities, potential meanings, and locations of the signaling bits in a frame format of a trigger frame.

FIG. 12A shows example options 1210 for signaling tone mapping information in one-bit signaling fields according to some implementations. Each one-bit signaling field may include a bit to represent one of two potential values. A first value 1212 (such as "1") may indicate that the RU allocation information is for rRUs associated with contiguous tone mapping. A second value 1214 (such as "0) may indicate that the RU allocation information is for dRUs associated with distributed tone mapping. The spreading bandwidth design may include a single 80 MHz spreading bandwidth or the spreading bandwidth design may be inferred based on tone mapping information in other fields of the trigger frame (such as puncturing information and PPDU bandwidth information).

FIG. 12B shows example options 1220 for signaling tone mapping information in two-bit signaling fields according to some implementations. Each two-bit signaling field may include a combination of bits to represent one of three potential values. A first value 1222 (such as "11") may indicate that the RU allocation information is for rRUs associated with contiguous tone mapping. A second value 1224 (such as "10") may indicate that the RU allocation information is for dRUs associated with distributed tone mapping and that the spreading bandwidth design includes a single 80 MHz spreading bandwidth. A third value 1226 (such as "01") may indicate that the RU allocation information is for dRUs associated with distributed tone mapping and that the spreading bandwidth design includes a single 40 MHz spreading bandwidth. A reserved value (not shown, such as "00") may be reserved for other spreading bandwidth designs or other features.

FIG. 12C shows example options 1230 for signaling tone mapping information in three-bit signaling fields according to some implementations. Each three-bit signaling field may include a combination of bits to represent one of various potential values. A first value 1232 (such as "111") may indicate that the RU allocation information is for rRUs associated with contiguous tone mapping. A second value 1234 (such as "110") may indicate that the RU allocation information is for dRUs associated with distributed tone mapping and that the spreading bandwidth design includes a single 80 MHz spreading bandwidth. For example, the second value 1234 may correspond to the first option 1072 described with reference to FIG. 10.

A third value 1236 (such as "101") may indicate that the RU allocation information is for dRUs associated with distributed tone mapping and that the spreading bandwidth design includes a single 40 MHz spreading bandwidth (in either a lower 40 MHz or an upper 40 MHz portion of an 80 MHz bandwidth subchannel). For example, the third value 1236 may correspond to the second option 1074 described with reference to FIG. 10. As described further with reference to FIG. 13, both the "40-X" and "X-40" configurations may be represented by a same signaling value because the location of the single 40 MHz spreading bandwidth may be inferred based on a location of the logical RU in a tone plan.

Continuing with the example options 1230, a fourth value 1238 (such as "100") may indicate that the RU allocation information is for dRUs associated with distributed tone mapping and that the spreading bandwidth design includes a 20 MHz spreading bandwidth in the lower 40 MHz and a 40 MHz spreading bandwidth in the upper 40 MHz of an 80 MHz bandwidth subchannel. For example, the fourth value 1238 may correspond to the third option 1076 described with reference to FIG. 10. The "20-X-40" and "X-20-40" spreading bandwidth designs may be represented by a same signaling value and the location of the 20 MHz spreading bandwidth may be inferred based on a location of the logical RU in a tone plan.

A fifth value 1242 (such as "11") may indicate that the RU allocation information is for dRUs associated with distributed tone mapping and that the spreading bandwidth design includes a 40 MHz spreading bandwidth in the lower 40 MHz and a 20 MHz spreading bandwidth in the upper 40 MHz of an 80 MHz bandwidth subchannel. For example, the fifth value 1242 may correspond to the fourth option 1078 described with reference to FIG. 10. The "40-X-20" and "40-20-X" spreading bandwidth designs may be represented by a same signaling value and the location of the 20 MHz spreading bandwidth may be inferred based on a location of the logical RU in a tone plan.

FIG. 12D shows example options 1240 for signaling tone mapping information and may be used with a 20 MHz bandwidth or 40 MHz bandwidth TB PPDU according to some implementations. The 802.11 standard indicates that puncturing cannot be more than 50% of the bandwidth for a PPDU. Thus, the options described with reference to FIGS. 12A, 12B, and 12C are useful for PPDUs of 80 MHZ bandwidth or larger. To support puncturing in a smaller TB PPDU (such as 20 MHz, 40 MHz, or 80 MHz TB PPDUs), additional spreading bandwidth design options may be useful. The example options 1240 include spreading bandwidth designs with smaller spreading bandwidths for smaller TB PPDUs.

A first value 1252 (such as "11") may indicate that the RU allocation information is for rRUs associated with contiguous tone mapping. A second value 1254 (such as "10") may indicate that the RU allocation information is for dRUs associated with distributed tone mapping and that the spreading bandwidth design includes a single 20 MHz spreading bandwidth. A third value 1256 (such as "01") may indicate that the RU allocation information is for dRUs associated with distributed tone mapping and that the spreading bandwidth design includes a single 40 MHz spreading bandwidth.

FIG. 12E shows example options 1250 for signaling tone mapping information in three-bit signaling fields based on a combined table for multiple sizes of TB PPDU according to some implementations. Each three-bit signaling field may include a combination of bits to represent one of various potential values. The example options 1250 include a first value 1232, a second value 1234, a third value 1236, a fourth value 1238, and a fifth value 1242, having the same meanings as the corresponding values described with reference to FIG. 12C. The third value 1236 can also be used for a TB PPDU having 40 MHz (without puncturing). A sixth value 1264 may indicate that the RU allocation information is for dRUs associated with distributed tone mapping and that the spreading bandwidth design includes a single 20 MHz spreading bandwidth. In some implementations, the sixth value 1264 can only be used to represent a spreading bandwidth design for a 20 MHz or 40 MHz TB PPDU, so that the punctured portion of the TB PPDU is 50% or less in accordance with the IEEE 802.11 standard.

The example options 1210, 1220, 1230, 1240, and 1250 described with reference to FIGS. 12A, 12B, 12C, 12D, and 12E, respectively are provided as nonlimited examples for pedagogical purposes. Other options, values, and meanings may be attributed to other spreading bandwidth designs. In some implementations, a lookup table may be specified in the IEEE 802.11 standard and implemented in a memory of an AP and STA such that distinct values in the lookup table can represent a particular spreading bandwidth design or contiguous transmissions.

Figure 13:
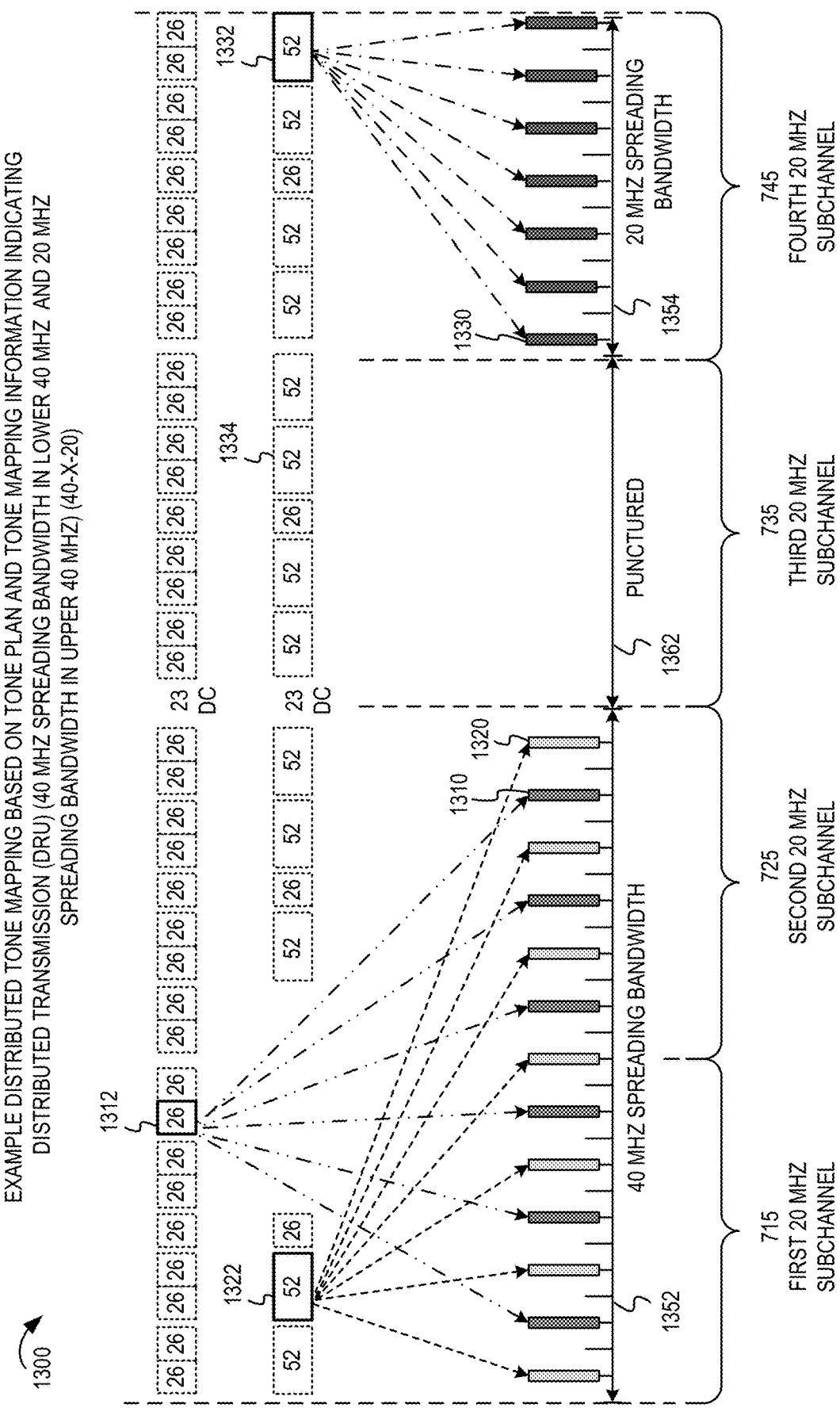
FIG. 13 shows example mappings for dRUs based on an example spreading bandwidth design for an 80 MHz subchannel.

FIG. 13 shows example mappings 1300 for dRUs based on an example spreading bandwidth design for an 80 MHz subchannel. The spreading bandwidth design described with reference to FIG. 13 may be associated with, for example, by the fifth value 1242 described with reference to FIG. 12. The fifth value 1242 is associated with both the "40-X-20" and "40-20-X" spreading bandwidth designs. However, an AP and a STA can determine the distributed tone mapping for a dRU based on a location of a corresponding logical RU in a tone plan for contiguous tone mapping. For reference purposes, a portion of the example tone plan 700 described with reference to FIG. 7 is reproduced in FIG. 13.

A trigger frame (not shown) may include RU allocation information that includes a first RU 1310 allocated for a first STA, a second RU 1320 allocated for a second STA, and a third RU 1330 allocated for a third STA. The RU allocation information may include RU identifiers that refer to logical RUs defined in a RU allocation table. The RU allocation table defines the RU identifier and the number of tones associated with each logical RU. In some implementations, an RU identifier in the RU allocation table may be used for either rRUs or dRUs (both having the same number of tones). As described herein, tone mapping information may indicate that the RU allocation information for this 80 MHz bandwidth subchannel refer to dRUs having noncontiguous tones spread over a spreading bandwidth. The tone mapping information also may indicate the spreading bandwidth design for the 80 MHz bandwidth subchannel. In the example of FIG. 13, the spreading bandwidth design includes a first spreading bandwidth 1352 (40 MHz spreading bandwidth) located in a lower 40 MHz of the 80 MHz bandwidth subchannel and a second spreading bandwidth 1354 (20 MHz spreading bandwidth) located in an upper 40 MHz of the 80 MHz bandwidth subchannel.

The first STA, having been allocated the first RU 1310 as a dRU, may determine a location of a corresponding rRU 1312 (sharing the same RU identifier in the RU allocation table) in a tone plan originally designed for contiguous tone mapping. The corresponding rRU 1312 is located in a lower 40 MHz of the 80 MHz bandwidth subchannel. Based on the spreading bandwidth pattern ("40-X-20"), the first STA can map the number of tones for the first RU 1310 over the first spreading bandwidth 1352 (40 MHz spreading bandwidth).

The second STA, having been allocated the second RU 1320 as a dRU, may determine a location of a corresponding rRU 1322 (sharing the same RU identifier in the RU allocation table) in a tone plan originally designed for contiguous tone mapping. The corresponding rRU 1322 is located in a lower 40 MHz of the 80 MHz bandwidth subchannel. Based on the spreading bandwidth pattern ("40-X-20"), the second STA can map the number of tones for the second RU 1320 over the first spreading bandwidth 1352 (40 MHz spreading bandwidth).

The third STA, having been allocated the third RU 1320 as a dRU, may determine a location of a corresponding rRU 1332 (sharing the same RU identifier in the RU allocation table) in a tone plan originally designed for contiguous tone mapping. The corresponding rRU 1332 is located in an upper 40 MHz of the 80 MHz bandwidth subchannel. Based on the spreading bandwidth pattern ("40-X-20"), the third STA knows that the upper 40 MHz of the 80 MHz bandwidth subchannel has a 20 MHz spreading bandwidth. The third STA can map the number of tones for the third RU 1330 over the second spreading bandwidth 1354 (20 MHz spreading bandwidth). The location of the second spreading bandwidth 1354 is in the fourth 20 MHz subchannel 745 because the corresponding rRU 1332 is defined with tones in the fourth 20 MHz subchannel 745 (rather than in the third 20 MHz subchannel 735). The third 20 MHz subchannel 735 is effectively punctured as a result of the spreading bandwidth design and the RU allocations.

Recall that a same signaling value may indicate either the "40-X-20" or the "40-20-X" spreading bandwidth designs. In the example of FIG. 13, the "40-X-20" spreading bandwidth design is used based on the location of the corresponding rRU 1332 in the tone plan for the contiguous tone mapping. However, consider a scenario where the third STA was allocated a different dRU, such as a dRU having the same RU identifier as a corresponding rRU 1334 (rather than rRU 1332). In that scenario, the corresponding rRU 1334 is located in the third 20 MHz subchannel 735, so the dRU would be mapped to a 20 MHz spreading bandwidth (not shown) in the third 20 MHz subchannel 735 according to a "40-20-X" spreading bandwidth design.

Figure 14:
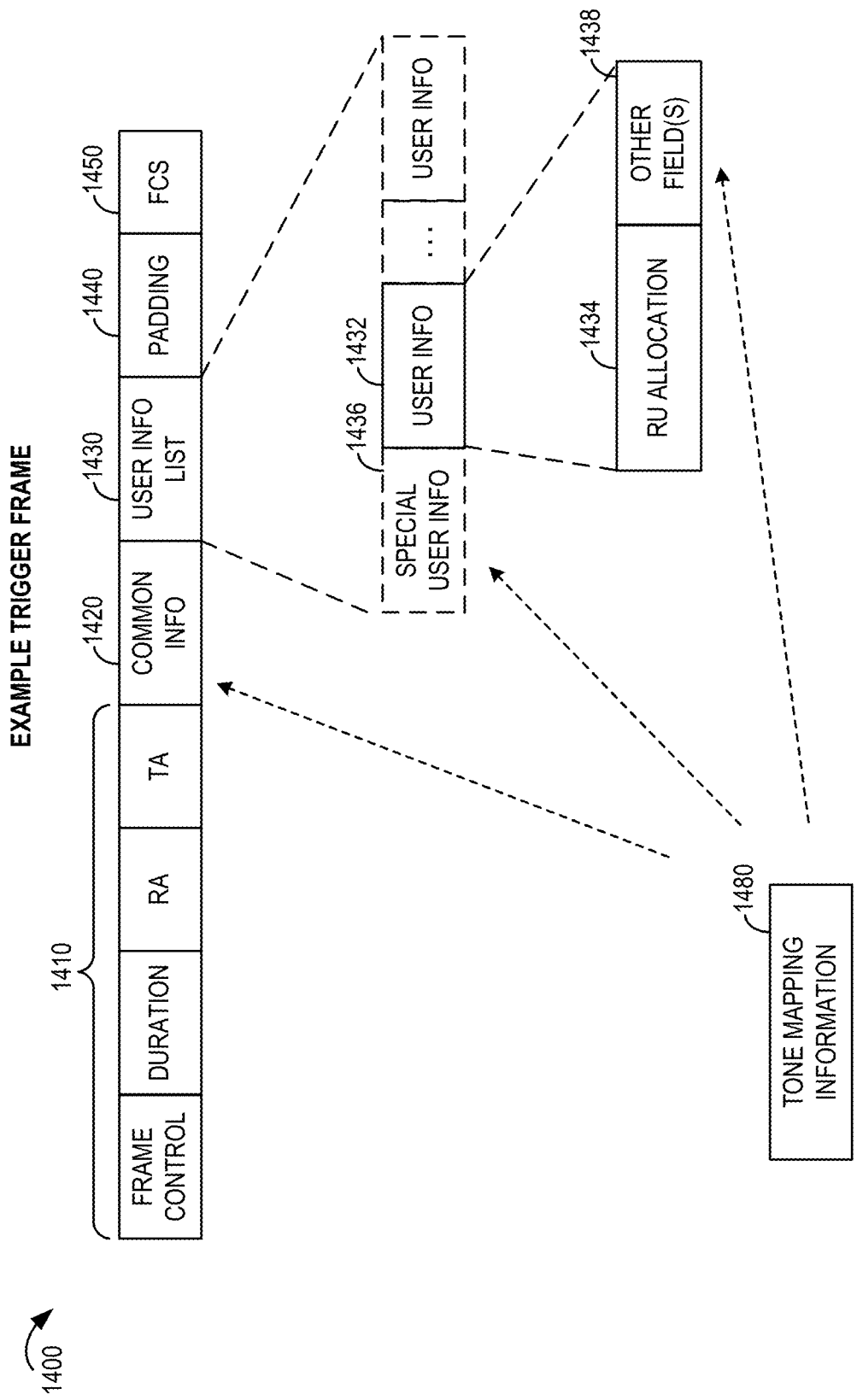
FIG. 14 shows an example trigger frame usable for communications between an AP and a number of STAs according to some implementations.

FIG. 14 shows an example trigger frame 1400 usable for communications between an AP and a number of STAs according to some implementations. The trigger frame 1400 may allocate one or more logical RUs (or MRUs) for transmission in the TB PPDU. In some implementations, each of the logical RUs may map to an rRU. In some other implementations, each of the logical RUs may map to a dRU. Still further, in some implementations, the logical RUs may map to a combination of rRUs and dRUs in different 80 MHz bandwidth subchannels. Tone mapping information 1480 included in one or more fields of the trigger frame 1400 may indicate whether the logical RUs allocated for each 80 MHz subchannel are mapped to rRUs or dRUs associated with a particular spreading bandwidth design. For example, a trigger frame may allocate dRUs in one or more 80 MHz subchannels and allocate rRUs in one or more other 80 MHz subchannels.

The trigger frame 1400 includes a MAC header 1410, a common information field 1420, a user information list 1430, zero or more padding bits 1440, and an FCS 1450. The MAC header 1410 includes a frame control field, a duration field, a receiver address (RA) field, and a transmitter address (TA) field. The common information field 1420 and user information list 1430 carry configuration information which may be used by a receiving device to configure a TB PPDU to be transmitted in response to receiving the trigger frame 1400. In some aspects, the user information list 1430 may include one or more user information fields 1432 each carrying per-user information for a respective user. In contrast, the common information field 620 may carry information that is common to all recipients of the trigger frame 600 (such as any users identified in the user information list 630).

In some implementations, each user information field 1432 may carry RU allocation information 1434 and other fields 1438. The RU allocation information 1434 indicates a logical RU (or MRU) that is allocated for transmission in the TB PPDU. The trigger frame 1400 may include multiple user information fields 1432 (to solicit a TB PPDU from multiple users). Furthermore, in some implementations, the user information field 1432 may include tone mapping information 1480 that indicates whether the logical RU is allocated for a contiguous transmission or a distributed transmission.

In some implementations, the user information list 1430 may further include a special user information field 1436. Each of the user information fields 1432 is identified by a unique AID value assigned to a particular STA (or user) in a BSS. In contrast, a special user information field 1436 may be identified by an AID value (such as "2007") that is not assigned to any STA in the BSS. In some aspects, the special user information field 1436 may be an extension of the common information field 1420. In other words, the special user information field 1436 also may carry information that is common to all users associated with the trigger frame.

Aspects of the present disclosure recognize that the trigger frame 1400 may include a number of reserved bits. Reserved bits represent unused bits that are reserved for future implementations of the IEEE 802.11 standard. In some aspects, one or more reserved bits in an earlier version or release of the IEEE 802.11 standard may be repurposed in a later version or release. For example, some reserved bits in the trigger frame 1400 may be repurposed, in later versions or releases of the IEEE 802.11 standard, to expand a range of values that can be represented by existing fields in an earlier version or release. Some other reserved bits in the trigger frame 1400 may be repurposed, in later versions or releases of the IEEE 802.11 standard, to convey information that is unrelated to any information conveyed in the earlier version or release (or remains unused in the later version or release). In accordance with some aspects of this disclosure, one or more of the reserved bits in the trigger frame 1400 may be repurposed to carry tone mapping information 1480. The tone mapping information may indicate the spreading bandwidth design associated with the wireless channel or each 80 MHz bandwidth subchannel of the wireless channel.

As described with reference to FIG. 11, the tone mapping information 1480 may include a plurality of signaling fields. Each signaling field may include one or more signaling bits. Each 80 MHz bandwidth subchannel of a wireless channel may have a separate signaling field. For example, a trigger frame for a 320 MHz bandwidth wireless channel may include four signal fields. When one-bit signaling fields are used (such as described with reference to FIG. 12A), the tone mapping information 1480 would include a total of four (4) bits. When two-bit signaling fields are used (such as described with reference to FIG. 12B), the tone mapping information 1480 would include a total of eight (8) bits. When three-bit signaling fields are used (such as described with reference to FIG. 12C), the tone mapping information 1480 would include a total of twelve (12) bits. In various examples of this disclosure, the tone mapping information 1480 (such as 4 signaling bits, 8 signaling bits, or 12 signaling bits) may be populated in existing fields of a frame format for a trigger frame. In some implementations, the values of signaling bits to represent different meanings may be chosen based on existing frame formats that define default values for certain reserved bits. For example, in a one-bit signaling field, a first value (such as "0") may indicate contiguous transmissions (as a default transmission mode) if "0" was the default value for that reserved bit, while a second value (such as "1") may indicate a distributed transmission as a departure from the default transmission mode.

Table 1 shows a listing of potential locations for tone mapping information 1480 to be populated in an existing frame format for a trigger frame.

TABLE 1

| Field | Reserved Bits | Number of Bits Available |
|---|---|---|
| Common Info field | B56-B62 | 7 |
| Common Info field | B63 | 1 |
| Special User Info field ("Reserved Bits") | B37-B39 | 3 |
| Special User Info field ("Disregard Bits") | B25-B30 B32-B36 | 11 |
| Special User Info field ("Trigger Dependent User Info" subfield) | B40-B47 | 8 |
| User Info Field | B25 | 1 |

In some implementations, the tone mapping information 1480 may include four signaling bits populated in bit locations B56-B59 of the common field. A first signaling bit populated in bit location B56 may indicate whether the first 80 MHz subchannel (referred to as the primary 80 MHz subchannel, or "Primary 80") includes dRUs or rRUs. A second signaling bit populated in bit location B57 may indicate whether the second 80 MHz subchannel (referred to as the secondary 80 MHz subchannel, or "Secondary 80") includes dRUs or rRUs. A third signaling bit populated in bit location B58 may indicate whether the third 80 MHz subchannel (a lower 80 MHz portion of a secondary 160 MHz subchannel, or "Secondary 160") includes dRUs or rRUs. A fourth signaling bit populated in bit location B59 may indicate whether the fourth 80 MHz subchannel (an upper 80 MHz portion of the Secondary 160) includes dRUs or rRUs.

In some other implementations, tone mapping information 1480 may include eight signaling bits (two signal bits per each 80 MHz bandwidth subchannel) populated in bit locations B56-B63 of the common field.

In some other implementations, the tone mapping information 1480 may include a value selected from a predetermined table that identifies potential combinations of spreading bandwidth designs among a plurality of 80 MHz bandwidth subchannels. If each 80 MHz bandwidth subchannel can have three options (rRU, dRU with 80 MHz spreading bandwidth, or dRU with 40 MHz spreading bandwidth) and there are four 80 MHz bandwidth subchannels, there is a total of 81 potential combinations ($3^4$ potential combinations). A 7-bit table could include a value for each potential combination. Thus, the tone mapping information 1480 may be represented as a seven bit field in the common information field 1420. The 7-bit table may be defined in a technical standard and stored in a memory of the STA to determine the spreading bandwidth designs for the 80 MHz bandwidth subchannels.

In some other implementations, the quantity of signaling bits for the tone mapping information 1480 may depend on a PPDU bandwidth of the solicited TB PPDU. The common information field 1420 includes a field ("UL BW") that specifies the PPDU bandwidth of the solicited TB PPDU. When the PPDU bandwidth of the TB PPDU is 160 MHz bandwidth or smaller, the tone mapping information 1480 may include three signaling bits per 80 MHz bandwidth subchannel (totaling up to 6 signaling bits) which can be populated in the common information field. When the PPDU bandwidth of the TB PPDU is greater than 160 MHz bandwidth, the tone mapping information 1480 may be split such that a first quantity of signaling bits (such as 6 signaling bits) are populated in the common information field and a second quantity of signaling bits (up to 6 additional signaling bits) are populated in the special user information field 1436.

In some other implementations, the tone mapping information 1480 may be included in a second special user information field (not shown) or other new field (not shown) that is added to the frame format for a trigger frame. For example, the second special user information field or the other new field may follow the common information field 1420 or the special user information field 1436 in the frame format. A bit in the common information field 1420 or the special user information field 1436 may indicate that the trigger frame includes the second special user information field or the other new field that carries all or part of the tone mapping information 1480.

In some other implementations, part or all of the tone mapping information 1480 may be included in each user information field 1432. Each user information field 1432 may carry information specific to a particular STA. The other fields 1438 may explicitly indicate a spreading bandwidth for the logical RU identified in the RU allocation information 1434 field. In some implementations, the tone mapping information 1480 includes a bitmap in the common information field 1420 can indicate, on a per-80 MHZ subchannel basis, whether the RU allocations within each 80 MHZ subchannel are for contiguous transmissions or distributed transmissions. The tone mapping information 1480 also may include two additional signaling bits within each user information field 1432 to indicate the spreading bandwidth for dRUs that are within an 80 MHz subchannel associated with distributed transmissions.

In some other implementations, the tone mapping information 1480 may be carried as separate parts within a user information field 1432. For example, one signaling bit (such as bit location B25) may indicate whether the RU allocation information 1434 field in the user information field 1432 is for a dRU or an rRU. Two additional signaling bits in the user information field 1432 can indicate the spreading bandwidth (such as 20 MHz spreading bandwidth, 40 MHz spreading bandwidth or 80 MHz spreading bandwidth) for that dRU. The two additional signaling bits may be obtained without changing the format of the user information field 1432 by re-purposing an existing subfield (or redefining values for unused modes in that subfield). For example, if MU MIMO is not supported to transmit with dRU, then B26-B31 (SS Allocation subfield) can be reinterpreted as 2 bits for spreading bandwidth and 4 bits for number of streams (Nss) indication.

As described herein, the tone mapping information 1480 may include a combination of signaling bits, PPDU bandwidth information, and puncturing information. The spreading bandwidth design may be determined based on the tone mapping information. In some implementations, a technical standard (such as the IEEE 802.11 standard) may restrict distributed transmissions to a particular subchannel (such as the Primary 80) or may specify the spreading bandwidth design based on the PPDU bandwidth information and puncturing information. In some implementations, the technical standard may restrict distributed transmissions to only those 80 MHz bandwidth subchannels that do not have puncturing. In such cases, a single signaling bit (such as a dRU indication) per 80 MHz bandwidth subchannel may indicate whether the RU allocation information for the 80 MHz bandwidth subchannel is for a distributed transmission or a contiguous transmission. Alternatively, a single signaling bit in the user information field 1432 can indicate, on a per-RU basis, whether the RU allocation information refers to a dRU or an rRU.

FIG. 15 shows a common information field 1500 for a trigger frame formatted according to some implementations. More specifically, the common information field 1500 conforms to the Extremely High Throughput (EHT) variant common information field format defined by an initial release of the IEEE 802.11be amendment of the IEEE 802.11 standard. With reference for example to FIG. 14, the common information field 1500 may be one example of the common field 1420. In the example of FIG. 15, the common information field 1500 may be included in a trigger frame that is configured to solicit an EHT TB PPDU. Thus, the common information field 1500 includes a total of 9 reserved bits (in bit positions B22, B26, B56-B62, and B63).

In some implementations, any number of the reserved bits may be repurposed to carry the tone mapping information. In some other implementations, only a subset of the reserved bits in bit positions B56-B62 may be repurposed to carry the tone mapping information 922. In some other aspects, multiple reserved bits of the common information field 1500 may be replaced by a bitmap in future releases or versions of the IEEE 802.11 standard. For example, the value of each signaling bit of the bitmap may indicate whether a respective subchannel of a wireless channel is configured for contiguous transmissions or distributed transmissions. In some aspects, the bitmap may be 4 bits in length, where each bit represents a respective 80 MHz subchannel of a 320 MHz channel. As such, the value of each bit may indicate whether each logical RU (or MRU) allocated within a respective 80 MHz subchannel maps to an rRU or a dRU. In some other aspects, the bitmap may be 8 bits in length, where each bit represents a respective 40 MHz subchannel of a 320 MHz channel. As such, the value of each bit may indicate whether each logical RU (or MRU) allocated within a respective 40 MHz subchannel maps to an rRU or a dRU.

In some other aspects, the bitmap may be 4 bits in length, where each bit represents a respective 20 MHz subchannel of an 80 MHz channel. As such, the value of each bit may indicate whether each logical RU (or MRU) allocated within a respective 20 MHz subchannel maps to an rRU or a dRU. In some other aspects, the bitmap may be 8 bits in length, where each bit represents a respective 20 MHz subchannel of a 160 MHz channel. As such, the value of each bit may indicate whether each logical RU (or MRU) allocated within a respective 20 MHz subchannel maps to an rRU or a dRU.

The common information field 1500 may include a bit (such as bit position B55) to indicate that a special user information field is present. In some implementations, another signaling bit (such as any of bits B56-B62 or B63) may indicate that a second special user information field or other new field (such as a tone mapping information field) is included in the trigger frame.

Figure 16:
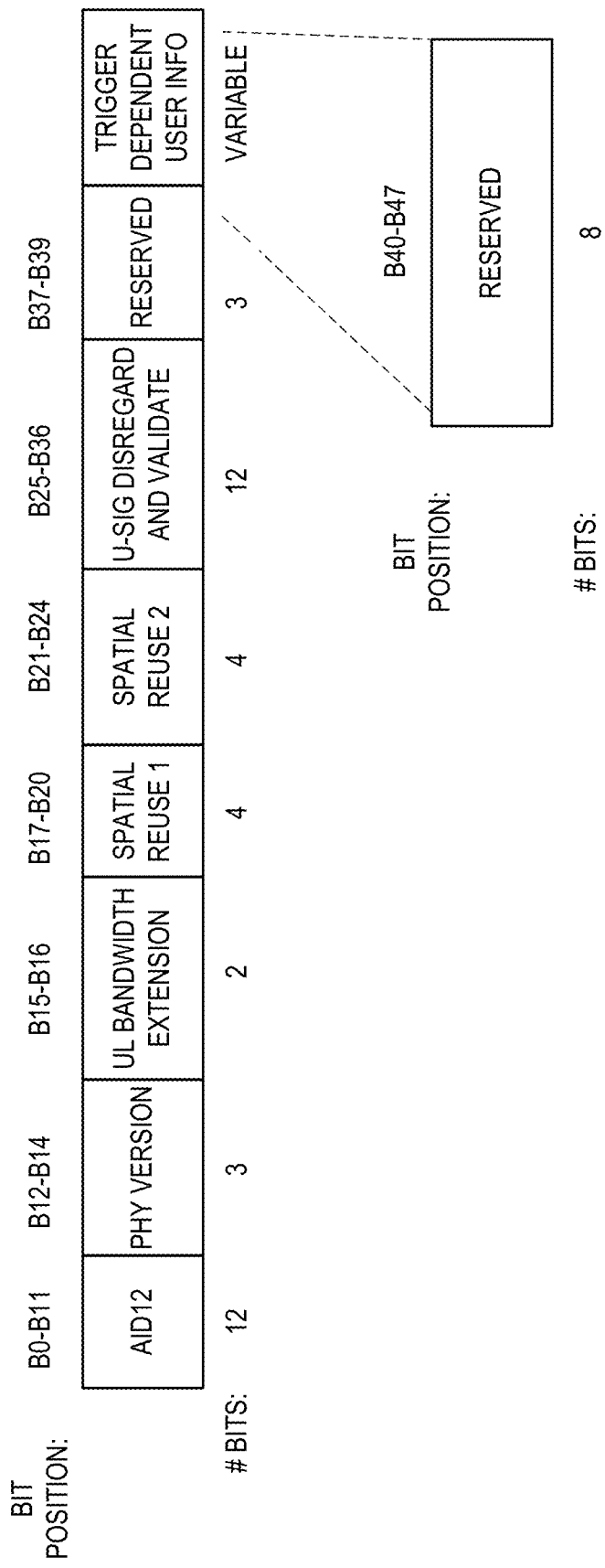
FIG. 16 shows a special user information field for a trigger frame formatted according to some implementations.

FIG. 16 shows a special user information field for a trigger frame formatted according to some implementations. More specifically, the special user information field 1600 conforms to the special user information field format defined by an initial release of the IEEE 802.11be amendment of the IEEE 802.11 standard. Thus, the AID12 subfield (in bit positions B0-B10) may carry an AID value equal to "2007." With reference for example to FIG. 14, the special user information field 1600 may be one example of the special user information field 1436. More specifically, the special user information field 1600 may be an extension of a common information field of the underlying trigger frame (such as the common information field 1420). In the example of FIG. 16, the special user information field 1600 may include a 3 reserved bits (in bit position B37-B39 of the special user information field 1600) and 12 U-SIG disregard and validate bits (in bit positions B25-B36).

The special user information field 1600 also may include a trigger dependent user subfield. The presence and length of the trigger dependent user information subfield may depend on the variant of the trigger frame. For example, in a Basic trigger frame and a beamforming report poll (BFRP) trigger frame, the trigger dependent user information subfield includes one octet (8 bits) of reserved bits. In a multi-user block acknowledgement request (MU-BAR) Trigger frame and a group cast with retries (GCR) MU-BAR Trigger frame, the trigger dependent user information subfield includes four octets and all the subfields, except for the black acknowledgement request (BAR) Type subfield, are reserved.

In some implementations, any number of the reserved bits in the special user information field 1600 may be repurposed to carry tone mapping information. In some other implementations, the tone mapping information may be carried by one or more of the U-SIG disregard and validate bits (such as to carry over the tone mapping information to the U-SIG of the TB PPDU). In some aspects, a reserved bit of the special user information field 1600 may be replaced by a distributed transmission bit (or subfield) in future releases or versions of the IEEE 802.11 standard. For example, the value of the distributed transmission bit (or subfield) may indicate whether the TB PPDU supports contiguous transmissions or distributed transmissions and the spreading bandwidth design. In some other aspects, multiple reserved bits of the special user information field 1600 may be replaced by with signaling bits for tone mapping information in future releases or versions of the IEEE 802.11 standard. For example, the value of each signaling subfield may indicate whether a respective subchannel of a wireless channel is configured for contiguous transmissions or distributed transmissions and the spreading bandwidth design.

Figure 17:
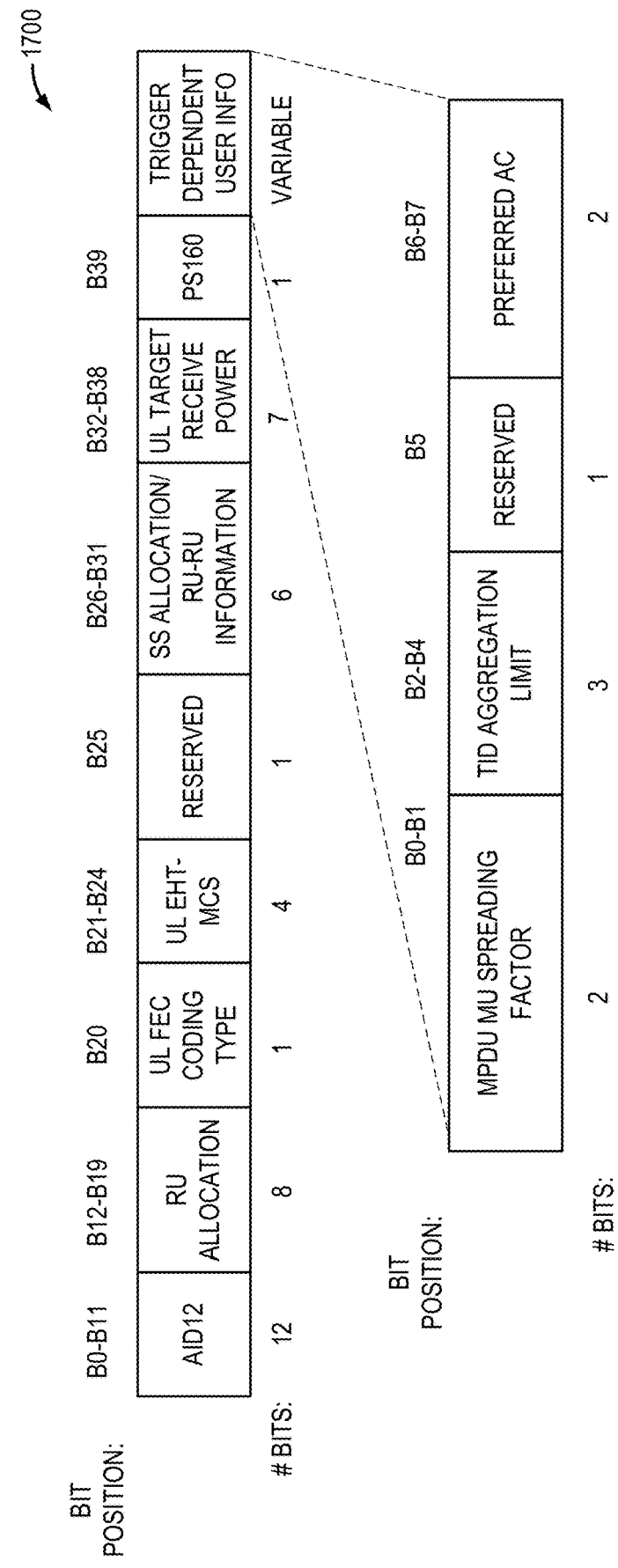
FIG. 17 shows a user information field for a trigger frame formatted according to some implementations.

FIG. 17 shows a user information field for a trigger frame formatted according to some implementations. More specifically, the user information field 1700 conforms to the EHT variant user information field format defined by an initial release of the IEEE 802.11be amendment of the IEEE 802.11 standard. With reference for example to FIG. 14, the user information field 1700 may be one example of the user information field 1432. Each user information field in a user information list is identified by a respective association identifier (AID) value in the AID12 subfield (in bit positions B0-B10). In some aspects, the AID value may uniquely identify a particular STA (or user) in a BSS. As shown in FIG. 17, the user information field 1700 includes two reserved bits (in bit position B25 of the user information field 1700 and bit position B5 of the trigger dependent user information subfield).

In some implementations, any number of the reserved bits in the user information field 1700 may be repurposed to carry the tone mapping information. In some other implementations, only the reserved bit in bit position B5 of the trigger dependent user information subfield may be repurposed to carry the tone mapping information. In some aspects, a reserved bit of the user information field 1700 may be replaced by a distributed transmission bit (or subfield) in future releases or versions of the IEEE 802.11 standard. For example, a first value of the distributed transmission bit (such as "0") may indicate that the logical RU (or MRU) allocated to a particular user or STA maps to an rRU. On the other hand, a second value of the distributed transmission bit (such as "1") may indicate that the logical RU (or MRU) allocated to a particular user or STA maps to a dRU.

The user information field 1700 also includes an RU allocation subfield (in bit positions B12-B19) and a PS160 subfield (in bit position B39). A combined value of the RU allocation subfield and the PS160 subfield maps to an entry in an RU allocation table. The RU allocation table is a lookup table that stores a number of entries representing respective RU or MRU allocations. Specifically, each entry in the RU allocation table may indicate a bandwidth, an RU/MRU size, and an RU/MRU index. In some implementations, the RU allocation information may include the value of the RU allocation subfield. In some aspects, any entry in the RU allocation table may be allocated for distributed transmissions. In some other aspects, only a subset of the entries in the RU allocation table may be allocated for distributed transmissions (such as 26-tone, 52-tone, 106-tone, 242-tone, and 484-tone RUs).

Figure 18:
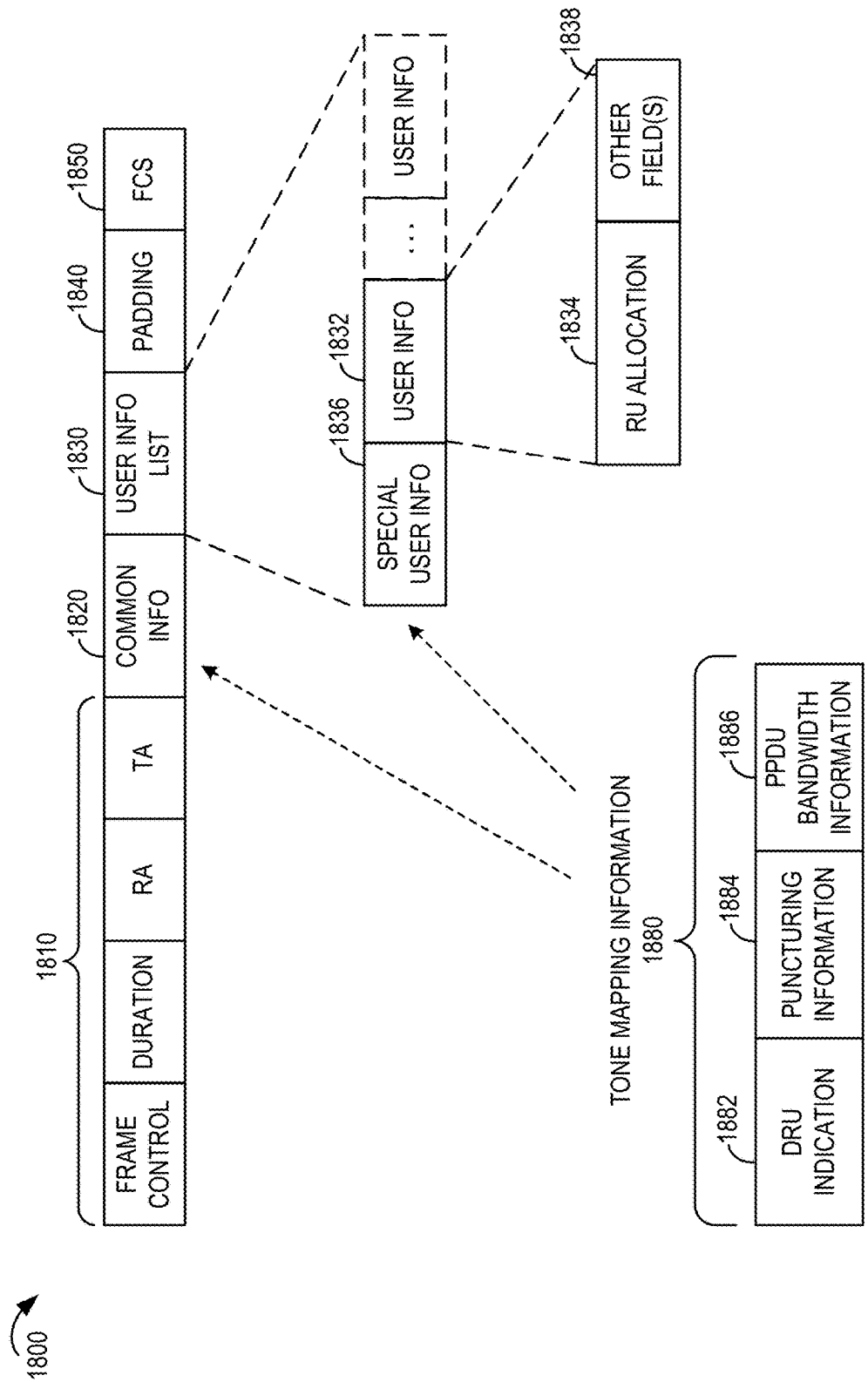
FIG. 18 shows another example trigger frame usable for communications between an AP and a number of STAs according to some implementations.

FIG. 18 shows another example trigger frame 1800 usable for communications between an AP and a number of STAs according to some implementations. Similar to the trigger frame 1400 described with reference to FIG. 14, the trigger frame 1800 may allocate one or more logical RUs (or MRUs) for transmission in the TB PPDU. The trigger frame 1800 includes a MAC header 1810, a common information field 1820, a user information list 1830, zero or more padding bits 1840, and an FCS 1850. The MAC header 1810 includes a frame control field, a duration field, a receiver address (RA) field, and a transmitter address (TA) field. The common information field 1820 and user information list 1830 carry configuration information which may be used by a receiving device to configure a TB PPDU to be transmitted in response to receiving the trigger frame 1800. In some aspects, the user information list 1830 may include one or more user information fields 1832 each carrying per-user information for a respective user. For example, each user information field 1832 may carry RU allocation information 1834 indicating a logical RU (or MRU) that is allocated for transmission in the TB PPDU. As described above, the logical RU represents a number (N) of tones on which a particular user or STA can transmit the TB PPDU.

The common information field 1820 and the special user information field 1836 may carry information that is common to all recipients of the trigger frame 1800. In some implementations, the common information field 1820 and the special user information field 1836 may carry tone mapping information 1880 indicative of a spreading bandwidth design for each 80 MHz bandwidth subchannel. For example, the tone mapping information 1880 may include a dRU indication bitmap 1882 indicating whether the logical RUs (or MRUs) allocated for each subchannel are for a contiguous transmission or a distributed transmission. Specifically, in some implementations, each bit of the dRU indication bitmap 1882 may represent a respective subchannel of the wireless channel. As such, some subchannels may be configured for contiguous transmissions while some other subchannels may be configured for distributed transmissions. The tone mapping information 1880 also may include puncturing information 1884 and PPDU bandwidth information 1886. For example, the puncturing information 1884 may indicate a puncturing pattern associated with one or more subchannels. For example, the puncturing information may include a bitmap or plurality of fields to indicate puncturing on a per-subchannel basis (such as per-20 MHz puncturing bitmap as a puncturing pattern for each 80 MHz subchannel or entire an 320 MHz bandwidth). The puncturing information 1884 may be signaled in one or more signaling bits per subchannel. In some implementations, the puncturing information 1884 may be related to the bandwidth spreading design options described with reference to FIGS. 12B and 12C, particularly those in which the bandwidth spreading design includes a spreading bandwidth that is less than the 80 MHz bandwidth subchannel. The PPDU bandwidth information 1886 may indicate the PPDU bandwidth of the solicited TB PPDU. For example, the PPDU bandwidth information 1886 may be populated in the "UL BW" subfield (bit locations B18-B19) of the common information field 1820 and the "UL BW Extension" subfield (bit locations B15-B16) of the special user info field 1836.

Figure 19:
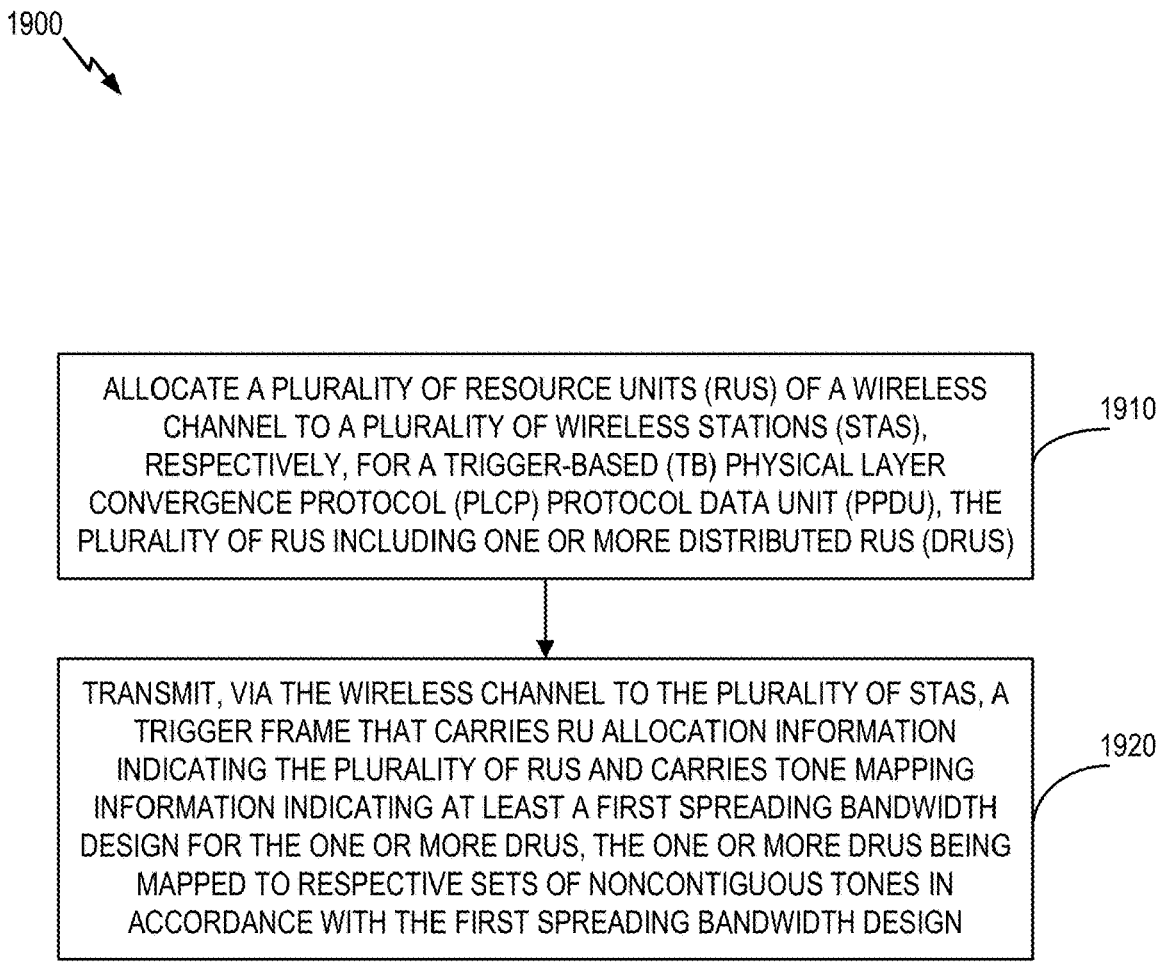
FIG. 19 shows a flowchart illustrating an example process for wireless communication that supports distributed resource unit (RU) signaling according to some implementations.

FIG. 19 shows a flowchart illustrating an example process 1900 for wireless communication that supports distributed RU signaling according to some implementations. In some implementations, the process 1900 may be performed by a wireless communication device operating as or within a network node, such as one of the STAs 104 or 504 described above with reference to FIGS. 1 and 5, respectively.

In some implementations, the process 1900 begins in block 1910 with allocating a plurality of RUs of a wireless channel to a plurality of STAs, respectively, for a TB PPDU. The plurality of RUs may include one or more dRUs.

In block 1920, the process 1900 proceeds transmitting, via the wireless channel to the plurality of STAs, a trigger frame that carries RU allocation information indicating the plurality of RUs and carries tone mapping information indicating at least a first spreading bandwidth design for the one or more dRUs, the one or more dRUs mapped to respective sets of noncontiguous tones in accordance with the first spreading bandwidth design.

Figure 20:
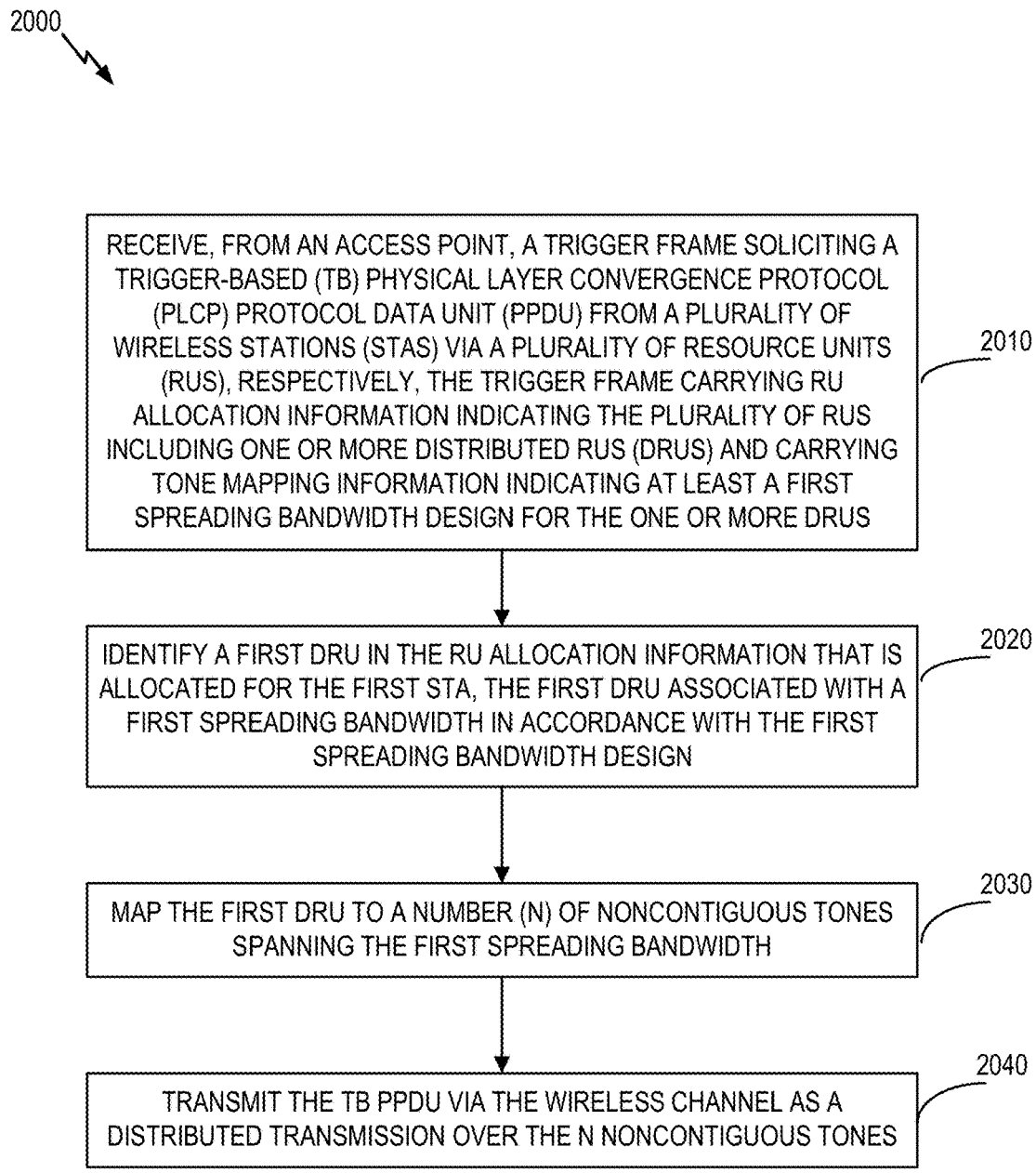
FIG. 20 shows a flowchart illustrating an example process for wireless communication that supports distributed RU signaling according to some implementations.

FIG. 20 shows a flowchart illustrating an example process 2000 for wireless communication that supports distributed RU signaling according to some implementations. In some implementations, the process 2000 may be performed by a wireless communication device operating as or within an AP such as one of the APs 102 or 502 of FIGS. 1 and 4, respectively.

In some implementations, the process 2000 begins in block 2010 with receiving, from an access point, a trigger frame soliciting a TB PPDU from a plurality of wireless stations (STAs) via a plurality of resource units (RUs), respectively, the trigger frame carrying RU allocation information indicating the plurality of RUs including one or more distributed RUs (dRUs) and carrying tone mapping information indicating at least a first spreading bandwidth design for the one or more distributed RUs (dRUs).

In block 2020, the process 2000 proceeds with identifying a first dRU in the RU allocation information that is allocated for the first STA, the first dRU associated with a first spreading bandwidth in accordance with the first spreading bandwidth design.

In block 2030, the process 2000 proceeds with mapping the first dRU to a number (N) of noncontiguous tones spanning the first spreading bandwidth.

In block 2040, the process 2000 proceeds with transmitting the TB PPDU via the wireless channel as a distributed transmission over the N noncontiguous tones.

Figure 21:
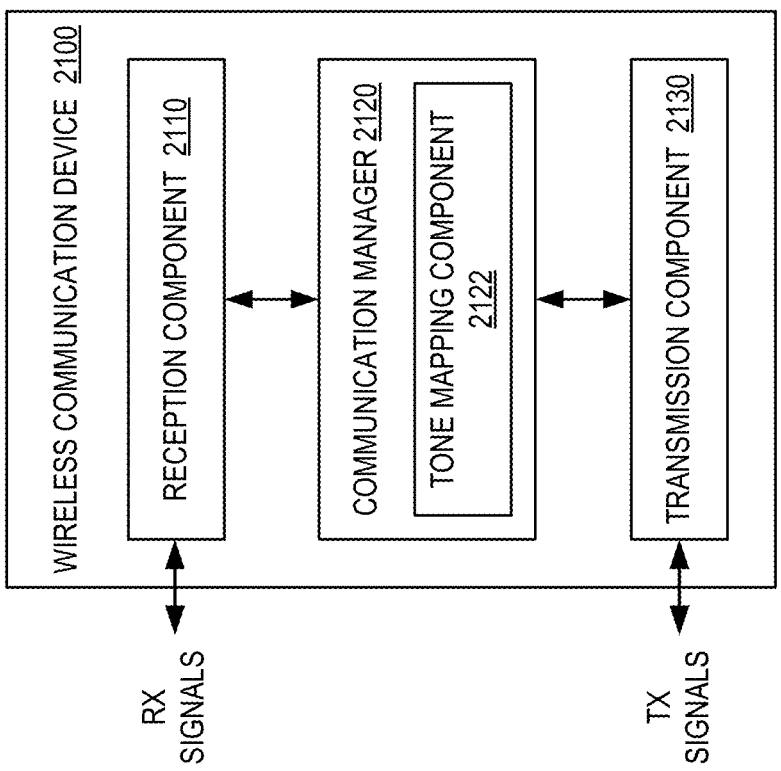
FIG. 21 shows a block diagram of an example wireless communication device according to some implementations.

FIG. 21 shows a block diagram of an example wireless communication device 2100 according to some implementations. In some implementations, the wireless communication device 2100 is configured to perform the process 2100 described above with reference to FIG. 21. The wireless communication device 2100 can be an example implementation of the wireless communication device 400 described above with reference to FIG. 4. For example, the wireless communication device 2100 can be a chip, SoC, chipset, package or device that includes at least one processor and at least one modem (for example, a Wi-Fi (IEEE 802.11) modem or a cellular modem).

The wireless communication device 2100 includes a reception component 2100, a communication manager 2120, and a transmission component 2130. The communication manager 2120 further includes a tone mapping component 2122. Portions of the tone mapping component 2122 may be implemented at least in part in hardware or firmware. In some implementations, the tone mapping component 2122 is implemented at least in part as software stored in a memory (such as the memory 408). For example, portions of the tone mapping component 2122 can be implemented as non-transitory instructions (or "code") executable by a processor (such as the processor 406) to perform the functions or operations of the respective component.

The reception component 2100 is configured to receive RX signals, over a wireless channel, from one or more other wireless communication devices. In some implementations, the reception component 2100 may receive a trigger frame that solicits a TB PPDU from the wireless communication device 2100, where the trigger frame carries RU allocation information indicating a number (N) of tones allocated for the wireless communication device 2100 and carrying tone mapping information indicating a spreading bandwidth design. The communication manager 2120 is configured to control or manage communications with the one or more other wireless communication devices. In some implementations, the tone mapping component 2122 may map the N tones to N subcarrier indices associated with a wireless channel. The tone mapping component 2122 may map the N tones to a contiguous tones according to a tone plan for a contiguous transmission or may map the N tones to noncontiguous tones according to a spreading bandwidth for a distributed transmission. The transmission component 2130 is configured to transmit TX signals, over the wireless channel, to one or more other wireless communication devices. In some implementations, the transmission component 2130 may transmit the TB PPDU over the wireless channel based on the mapping of the N tones to the N subcarrier indices.

Figure 22:
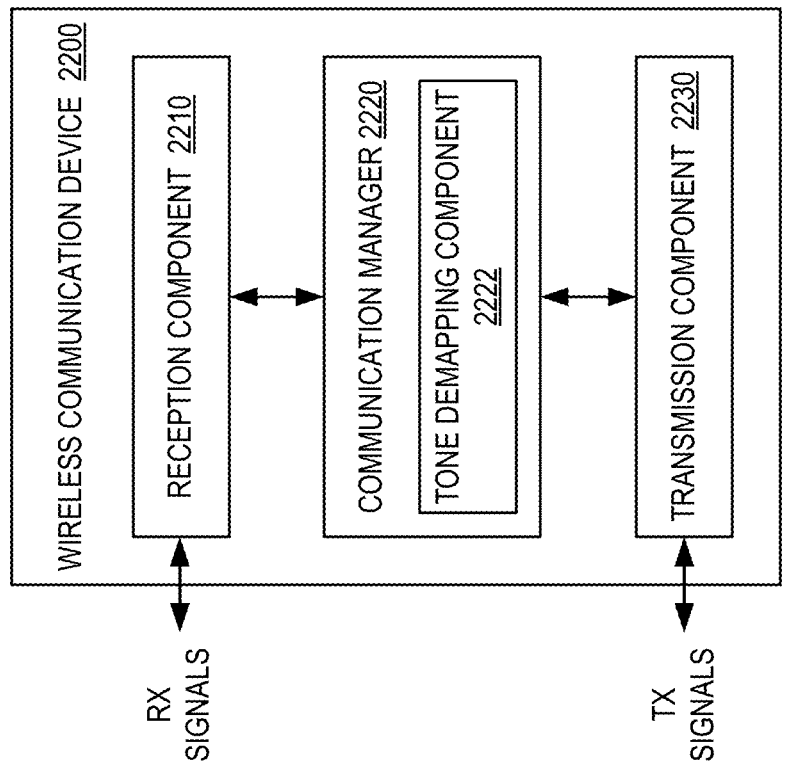
FIG. 22 shows a block diagram of an example wireless communication device according to some implementations.

FIG. 22 shows a block diagram of an example wireless communication device 2200 according to some implementations. In some implementations, the wireless communication device 2200 is configured to perform the process 2200 described above with reference to FIG. 22. The wireless communication device 2200 can be an example implementation of the wireless communication device 400 described above with reference to FIG. 4. For example, the wireless communication device 2200 can be a chip, SoC, chipset, package or device that includes at least one processor and at least one modem (for example, a Wi-Fi (IEEE 802.11) modem or a cellular modem).

The wireless communication device 2200 includes a reception component 2210, a communication manager 2220, and a transmission component 2230. The communication manager 2220 further includes a tone demapping component 2222. Portions of the tone demapping component 2222 may be implemented at least in part in hardware or firmware. In some implementations, the tone demapping component 2222 is implemented at least in part as software stored in a memory (such as the memory 408). For example, portions of the tone demapping component 2222 can be implemented as non-transitory instructions (or "code") executable by a processor (such as the processor 406) to perform the functions or operations of the respective component.

The reception component 2210 is configured to receive RX signals, over a wireless channel, from one or more other wireless communication devices. In some implementations, the reception component 2210 may receive a PPDU having a physical layer preamble followed by a data payload, where the physical layer preamble carries bandwidth information indicating a bandwidth of a wireless channel associated with the PPDU and carries distributed signaling information indicating whether the PPDU is transmitted as a contiguous transmission or a distributed transmission. The communication manager 2220 is configured to control or manage communications with the one or more other wireless communication devices. In some implementations, the tone demapping component 2222 may demap the PPDU from a number (N) of subcarrier indices associated with the wireless channel. The tone demapping component 2222 may demap the PPDU from N contiguous tones according to a tone plan for a contiguous transmission or may demap the PPDU from N noncontiguous tones according to a spreading bandwidth for a distributed transmission. The tone demapping component 2222 may recover the data payload based on the demapped PPDU. The transmission component 2230 is configured to transmit TX signals, over the wireless channel, to one or more other wireless communication devices. In some implementations, the transmission component 2230 may transmit a trigger frame soliciting the PPDU from the other wireless communication devices.

Figure 23:
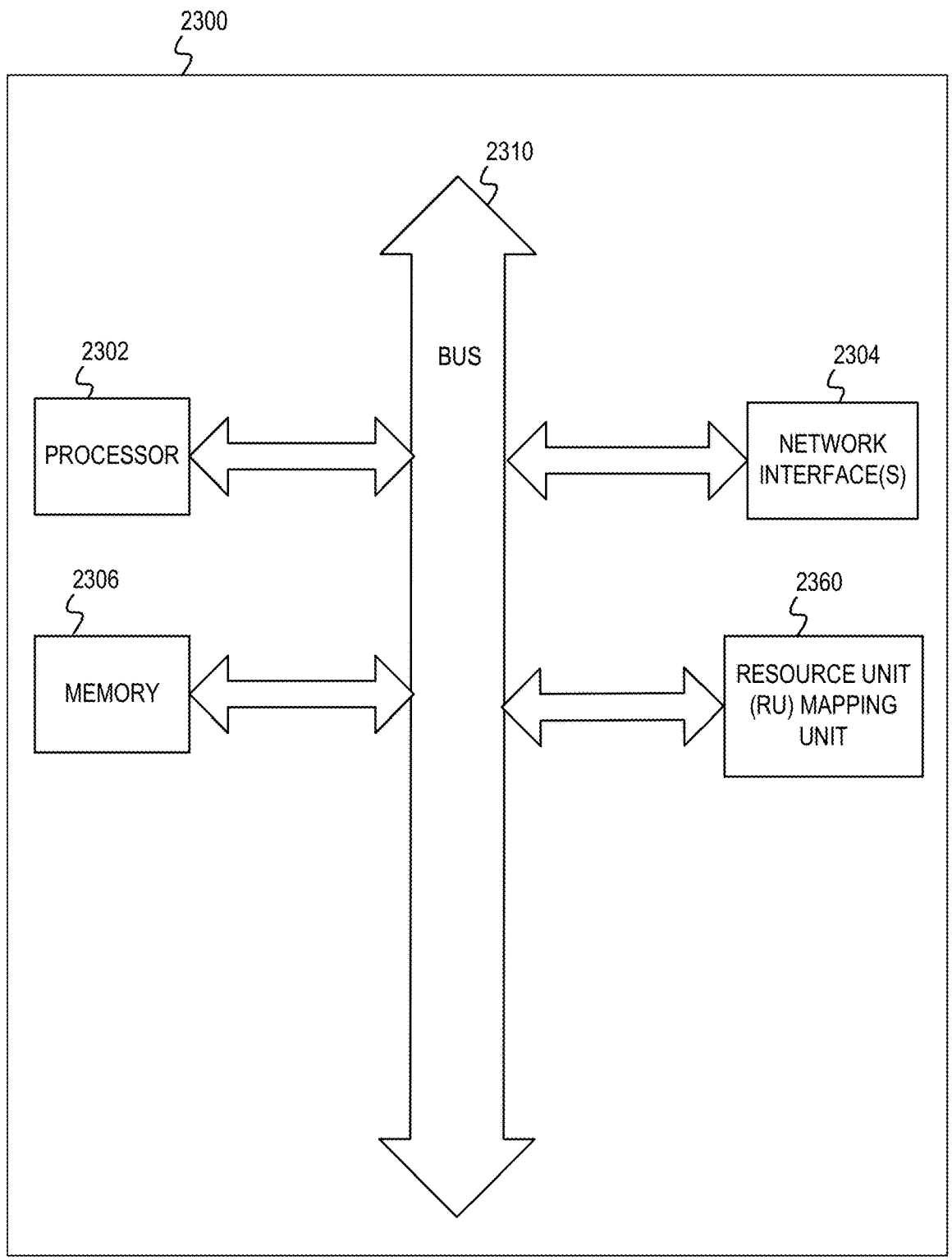
FIG. 23 shows a block diagram of an example electronic device.

FIG. 23 shows a block diagram of an example electronic device. In some implementations, the electronic device 2300 may be one of an access point (including any of the APs described herein), a range extender, or other electronic systems. The electronic device 2300 can include a processor 2302 (possibly including multiple processors, multiple cores, multiple nodes, or implementing multi-threading, etc.). The electronic device 2300 also can include a memory 2306. The memory 2306 may be system memory or any one or more of the possible realizations of computer-readable media described herein. The electronic device 2300 also can include a bus 2310 (such as PCI, ISA, PCI-Express, Hyper-Transport®, InfiniBand®, NuBus,® AHB, AXI, etc.), and a network interface 2304 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 2300 may support multiple network interfaces—each of which is configured to couple the electronic device 2300 to a different communication network.

The electronic device 2300 may include an RU mapping unit 2360. In some implementations, the RU mapping unit 2360 may be distributed within the processor 2302, the memory 2306, and the bus 2310. The RU mapping unit 2360 may perform some or all of the operations described herein. For example, the RU mapping unit 2360 may map a logical RU to a rRU or dRU according to a tone plan or a spreading bandwidth design, respectively. The RU mapping unit 2360 may prepare tone mapping information to include in a trigger frame or may process tone mapping information received via a trigger frame The memory 2306 can include computer instructions executable by the processor 2302 to implement the functionality of the implementations described in FIGS. 1-22. Any of these functionalities may be partially (or entirely) implemented in hardware or on the processor 2302. For example, the functionality may be implemented with an application-specific integrated circuit, in logic implemented in the processor 2302, in a co-processor on a peripheral device or card, etc. Further, realizations may include fewer or additional components not illustrated in FIG. 23 (such as video cards, audio cards, additional network interfaces, peripheral devices, etc.). The processor 2302, the memory 2306, and the network interface 2304 may be coupled to the bus 2310. Although illustrated as being coupled to the bus 2310, the memory 2306 may be coupled to the processor 2302.

FIGS. 1-23 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (enumerated as clauses for reference).

Clauses

Clause 1. A method for wireless communication by an access point (AP), comprising: allocating a plurality of resource units (RUs) of a wireless channel to a plurality of wireless stations (STAs), respectively, for a trigger-based (TB) physical layer convergence protocol (PLCP) protocol data unit (PPDU), the plurality of RUs including one or more distributed RUs (dRUs); transmitting, via the wireless channel to the plurality of STAs, a trigger frame that carries RU allocation information indicating the plurality of RUs and carries tone mapping information indicating at least a first spreading bandwidth design for the one or more dRUs, the one or more dRUs being mapped to respective sets of noncontiguous tones in accordance with the first spreading bandwidth design.

Clause 2. The method of clause 1, where the tone mapping information includes: a plurality of signaling bits corresponding to a plurality of subchannels of the wireless channel, each signaling bit indicating whether RU allocations for a respective subchannel are regular RUs (rRUs) or dRUs, and one or more signaling fields indicating a respective spreading bandwidth design for a particular subchannel in instances that the RU allocations for the particular subchannel are dRUs.

Clause 3. The method of any one of clauses 1-2, further including: signaling the tone mapping information in a plurality of signaling fields of the trigger frame corresponding to a plurality of subchannels of the wireless channel, each signaling field including a value to indicate whether RU allocations for a respective subchannel are regular RUs (rRUs) or dRUs, where the value further indicates a respective spreading bandwidth design for the respective subchannel in instances that the RU allocations for the respective subchannel are dRUs.

Clause 4. The method of any one of clauses 1-3, where the plurality of signaling fields includes at least: a first signaling field corresponding to a first subchannel carrying a first value indicating that the RU allocation information includes the one or more dRUs allocated for the first subchannel and indicates the first spreading bandwidth design for the first subchannel, and a second signaling field corresponding to a second subchannel carrying a second value indicating that RUs allocated for a second subchannel are regular RUs (rRUs) mapped to respective sets of contiguous tones in accordance with a contiguous tone plan.

Clause 5. The method of any one of clauses 1-4, where the plurality of signaling fields includes a third signaling field corresponding to a third subchannel carrying a third value indicating that RUs allocated for the third subchannel are dRUs mapped to respective sets of noncontiguous tones in accordance with a second spreading bandwidth design.

Clause 6. The method of any one of clauses 1-5, further including: selecting the first spreading bandwidth design, from among a plurality of spreading bandwidth design options, to cause the TB PPDU to exclude a punctured portion of the wireless channel; and allocating the one or more dRUs based on respective locations of corresponding rRUs in a contiguous tone map such that the one or more dRUs are mapped to respective spreading bandwidths that exclude the punctured portion of the wireless channel.

Clause 7. The method of any one of clauses 1-6, further including: setting a PPDU bandwidth of the TB PPDU; selecting the first spreading bandwidth design, from among a plurality of spreading bandwidth design options, based on the PPDU bandwidth; and signaling the PPDU bandwidth of the TB PPDU in the trigger frame, where the tone mapping information associates with the PPDU bandwidth.

Clause 8. The method of clause 7, where: the first spreading bandwidth design includes a single spreading bandwidth that is equal to the PPDU bandwidth in instances that the PPDU bandwidth is less than 80 MHz bandwidth or the PPDU bandwidth is 80 MHz bandwidth and there is no puncturing in TB PPDU, and the first spreading bandwidth design is limited to 80 MHz bandwidth within each 80 MHz subchannel in instances that the PPDU bandwidth is greater than 80 MHz bandwidth.

Clause 9. The method of any one of clauses 1-8, further including: signaling the tone mapping information in a plurality of signaling fields of the trigger frame, each signaling field associated with a respective 80 MHz bandwidth subchannel for the wireless channel; and populating each signal field with a value selected from a group consisting of: a first value indicating that RU allocations for the respective 80 MHz subchannel are associated with a contiguous tone mapping, a second value indicating that RU allocations for the respective 80 MHz subchannel are associated with distributed tone mapping and further indicating a spreading bandwidth design that includes a single 80 MHz spreading bandwidth, and a third value indicating that RU allocations for the respective 80 MHz subchannel are associated with distributed tone mapping and further indicating a spreading bandwidth design that includes a single 40 MHz spreading bandwidth.

Clause 10. The method of any one of clauses 1-9, further including: signaling the tone mapping information in a plurality of signaling fields of the trigger frame, each signaling field associated with a respective 80 MHz bandwidth subchannel for the wireless channel; and populating each signal field with a value selected from a group consisting of: a first value indicating that RU allocations for the respective 80 MHz subchannel are associated with a contiguous tone mapping, a second value indicating that RU allocations for the respective 80 MHz subchannel are associated with distributed tone mapping and further indicating a spreading bandwidth design that includes a single 80 MHz spreading bandwidth, a third value indicating that RU allocations for the respective 80 MHz subchannel are associated with distributed tone mapping and further indicating a spreading bandwidth design that includes a single 40 MHz spreading bandwidth, a fourth value indicating that RU allocations for the respective 80 MHz subchannel are associated with distributed tone mapping and further indicating a spreading bandwidth design that includes a 20 MHz spreading bandwidth within a lower 40 MHz bandwidth portion of the respective 80 MHz subchannel and a 40 MHz spreading bandwidth within an upper 40 MHz bandwidth portion of the respective 80 MHz subchannel, a fifth value indicating that RU allocations for the respective 80 MHz subchannel are associated with distributed tone mapping and further indicating a spreading bandwidth design that includes a 40 MHz spreading bandwidth within the lower 40 MHz bandwidth portion of the respective 80 MHz subchannel and a 20 MHz spreading bandwidth within the upper 40 MHz bandwidth portion of the respective 80 MHz subchannel, and a sixth value indicating that RU allocations for the TB PPDU are associated with distributed tone mapping and further indicating a spreading bandwidth design that includes a single 20 MHz spreading bandwidth.

Clause 11. The method of any one of clauses 1-10, further including setting a PPDU bandwidth for the TB PPDU, the PPDU bandwidth being 20 MHz bandwidth or 40 MHz bandwidth; and signaling the tone mapping information in a signal field of the trigger frame carrying a value selected from a group consisting of: a first value indicating that RU allocations for the TB PPDU are associated with a contiguous tone mapping, a second value indicating that RU allocations for the TB PPDU are associated with distributed tone mapping and further indicating a spreading bandwidth design that includes a single 20 MHz spreading bandwidth, and a third value indicating that RU allocations for the TB PPDU are associated with distributed tone mapping and further indicating a spreading bandwidth design that includes a single 40 MHz spreading bandwidth.

Clause 12. The method of any one of clauses 1-11, further including: incorporating all or part of the tone mapping information in the trigger frame as one or more signaling bits in a common information field or a special user information field of the trigger frame that carry information common to multiple STAs having dRUs allocated in the trigger frame.

Clause 13. The method of any one of clauses 1-12, further including: incorporating a first part of the tone mapping information in the trigger frame as one or more signaling bits in a common information field of the trigger frame; and incorporating a second part of the tone mapping information in the trigger frame as one or more signaling bits in a special user information field of the trigger frame.

Clause 14. The method of any one of clauses 1-13, further including: setting a PPDU bandwidth of the TB PPDU; and splitting the tone mapping information to the first part and the second part in instances that the PPDU bandwidth of the TB PPDU is greater than 160 MHz bandwidth.

Clause 15. The method of any one of clauses 1-14, further including: indicating, by at least a first signaling bit in a common information field or a first special user information field of the trigger frame, that the trigger frame includes a second special user information field; and incorporating all or part of the tone mapping information in the second special user information field.

Clause 16. The method of any one of clauses 1-15, further including: incorporating all or part of the tone mapping information in the trigger frame as one or more signaling bits in a user information field that carries information specific to a first dRU allocated to a first STA.

Clause 17. The method of any one of clauses 1-16, further including: incorporating a first part of the tone mapping information in the trigger frame as one or more signaling bits in a common information field or a special user information field of the trigger frame; and incorporating a second part of the tone mapping information in the trigger frame as one or more signaling bits in a user information field that carries information specific to a first dRU allocated to a first STA.

Clause 18. The method of any one of clauses 1-17, where generating the trigger frame includes: signaling the tone mapping information in a combination of a plurality of signaling fields corresponding to a plurality of subchannels of the wireless channel, puncturing information and uplink (UL) PPDU bandwidth information regarding the TB PPDU such that the first spreading bandwidth design is derivable from the combination of the plurality of signaling fields, the puncturing information and the UL PPDU bandwidth information.

Clause 19. The method of any one of clauses 1-18, where the one or more dRUs include at least a first dRU allocated for a first STA of the one or more STAs, the method further including: receiving a distributed transmission from the first STA via the first dRU; and demapping the distributed transmission to recover the TB PPDU from the first STA, the demapped distributed transmission include a number (N) of noncontiguous tones spanning a first spreading bandwidth in accordance with the first spreading bandwidth design.

Clause 20. A wireless communication device for wireless communication, including: at least one processor configured to allocate a plurality of resource units (RUs) of a wireless channel to a plurality of wireless stations (STAs), respectively, for a trigger-based (TB) physical layer convergence protocol (PLCP) protocol data unit (PPDU), the plurality of RUs including one or more distributed RUs (dRUs); and at least one modem configured to output a trigger frame for transmission via the wireless channel to the plurality of STAs that carries RU allocation information indicating the plurality of RUs and carries tone mapping information indicating at least a first spreading bandwidth design for the one or more dRUs, the one or more dRUs being mapped to respective sets of noncontiguous tones in accordance with the first spreading bandwidth design.

Clause 21. The wireless communication device of clause 20, where the at least one processor is configured to: signal the tone mapping information in a plurality of signaling fields of the trigger frame corresponding to a plurality of subchannels of the wireless channel, each signaling field including a value to indicate whether RU allocations for a respective subchannel are regular RUs (rRUs) or dRUs, where the value further indicates a respective spreading bandwidth design for the respective subchannel in instances that the RU allocations for the respective subchannel are dRUs.

Clause 22. The wireless communication device of any one of clauses 20-21, where the plurality of signaling fields includes at least: a first signaling field corresponding to a first subchannel carrying a first value indicating that the RU allocation information includes the one or more dRUs allocated for the first subchannel and indicates the first spreading bandwidth design for the first subchannel, and a second signaling field corresponding to a second subchannel carrying a second value indicating that RUs allocated for a second subchannel are regular RUs (rRUs) mapped to respective sets of contiguous tones in accordance with a contiguous tone plan.

Clause 23. The wireless communication device of any one of clauses 20-22, where the plurality of signaling fields includes a third signaling field corresponding to a third subchannel carrying a third value indicating that RUs allocated for the third subchannel are dRUs mapped to respective sets of noncontiguous tones in accordance with a second spreading bandwidth design.

Clause 24. The wireless communication device of any one of clauses 20-23, where the at least one processor is configured to: select the first spreading bandwidth design, from among a plurality of spreading bandwidth design options, to cause the TB PPDU to exclude a punctured portion of the wireless channel; and allocate the one or more dRUs based on respective locations of corresponding rRUs in a contiguous tone map such that the one or more dRUs are mapped to respective spreading bandwidths that exclude the punctured portion of the wireless channel.

Clause 25. The wireless communication device of any one of clauses 20-24, where the at least one processor is configured to: set a PPDU bandwidth of the TB PPDU; select the first spreading bandwidth design, from among a plurality of spreading bandwidth design options, based on the PPDU bandwidth; and signal the PPDU bandwidth of the TB PPDU in the trigger frame, where the tone mapping information includes the PPDU bandwidth.

Clause 26. The wireless communication device of any one of clauses 20-25, where: the first spreading bandwidth design includes a single spreading bandwidth that is equal to the PPDU bandwidth in instances that the PPDU bandwidth is less than 80 MHz bandwidth or the PPDU bandwidth is 80 MHz bandwidth and there is no puncturing in TB PPDU, and the first spreading bandwidth design is limited to 80 MHz bandwidth within each 80 MHz subchannel in instances that the PPDU bandwidth is greater than 80 MHz bandwidth.

Clause 27. The wireless communication device of any one of clauses 20-26, where the at least one processor is configured to: signal the tone mapping information in a plurality of signaling fields of the trigger frame, each signaling field associated with a respective 80 MHz bandwidth subchannel for the wireless channel; and populate each signal field with a value selected from a group consisting of: a first value indicating that RU allocations for the respective 80 MHz subchannel are associated with a contiguous tone mapping, a second value indicating that RU allocations for the respective 80 MHz subchannel are associated with distributed tone mapping and further indicating a spreading bandwidth design that includes a single 80 MHz spreading bandwidth, and a third value indicating that RU allocations for the respective 80 MHz subchannel are associated with distributed tone mapping and further indicating a spreading bandwidth design that includes a single 40 MHz spreading bandwidth.

Clause 28. The wireless communication device of any one of clauses 20-27, where the at least one processor is configured to: signal the tone mapping information in a plurality of signaling fields of the trigger frame, each signaling field associated with a respective 80 MHz bandwidth subchannel for the wireless channel; and populating each signal field with a value selected from a group consisting of: a first value indicating that RU allocations for the respective 80 MHz subchannel are associated with a contiguous tone mapping, a second value indicating that RU allocations for the respective 80 MHz subchannel are associated with distributed tone mapping and further indicating a spreading bandwidth design that includes a single 80 MHz spreading bandwidth, a third value indicating that RU allocations for the respective 80 MHz subchannel are associated with distributed tone mapping and further indicating a spreading bandwidth design that includes a single 40 MHz spreading bandwidth, a fourth value indicating that RU allocations for the respective 80 MHz subchannel are associated with distributed tone mapping and further indicating a spreading bandwidth design that includes a 20 MHz spreading bandwidth within a lower 40 MHz bandwidth portion of the respective 80 MHz subchannel and a 40 MHz spreading bandwidth within an upper 40 MHz bandwidth portion of the respective 80 MHz subchannel, a fifth value indicating that RU allocations for the respective 80 MHz subchannel are associated with distributed tone mapping and further indicating a spreading bandwidth design that includes a 40 MHz spreading bandwidth within the lower 40 MHz bandwidth portion of the respective 80 MHz subchannel and a 20 MHz spreading bandwidth within the upper 40 MHz bandwidth portion of the respective 80 MHz subchannel, and a sixth value indicating that RU allocations for the TB PPDU are associated with distributed tone mapping and further indicating a spreading bandwidth design that includes a single 20 MHz spreading bandwidth.

Clause 29. The wireless communication device of any one of clauses 20-28, where the at least one processor is configured to: set a PPDU bandwidth for the TB PPDU, the PPDU bandwidth being 20 MHz bandwidth or 40 MHz bandwidth; and signal the tone mapping information in a signal field of the trigger frame carrying a value selected from a group consisting of: a first value indicating that RU allocations for the TB PPDU are associated with a contiguous tone mapping, a second value indicating that RU allocations for the TB PPDU are associated with distributed tone mapping and further indicating a spreading bandwidth design that includes a single 20 MHz spreading bandwidth, and a third value indicating that RU allocations for the TB PPDU are associated with distributed tone mapping and further indicating a spreading bandwidth design that includes a single 40 MHz spreading bandwidth.

Clause 30. The wireless communication device of any one of clauses 20-29, where the at least one processor is configured to: incorporate all or part of the tone mapping information in the trigger frame as one or more signaling bits in a common information field or a special user information field of the trigger frame that carry information common to multiple STAs having dRUs allocated in the trigger frame.

Clause 31. The wireless communication device of any one of clauses 20-30, where the at least one processor is configured to: incorporate a first part of the tone mapping information in the trigger frame as one or more signaling bits in a common information field of the trigger frame; and incorporate a second part of the tone mapping information in the trigger frame as one or more signaling bits in a special user information field of the trigger frame.

Clause 32. The wireless communication device of any one of clauses 20-31, where the at least one processor is configured to: set a PPDU bandwidth of the TB PPDU; and split the tone mapping information to the first part and the second part in instances that the PPDU bandwidth of the TB PPDU is greater than 160 MHz bandwidth.

Clause 33. The wireless communication device of any one of clauses 20-32, where the at least one processor is configured to: indicate, by at least a first signaling bit in a common information field or a first special user information field of the trigger frame, that the trigger frame includes a second special user information field; and incorporate all or part of the tone mapping information in the second special user information field.

Clause 34. The wireless communication device of any one of clauses 20-33, where the at least one processor is configured to: incorporate all or part of the tone mapping information in the trigger frame as one or more signaling bits in a user information field that carries information specific to a first dRU allocated to a first STA.

Clause 35. The wireless communication device of any one of clauses 20-34, where the at least one processor is configured to: incorporate a first part of the tone mapping information in the trigger frame as one or more signaling bits in a common information field or a special user information field of the trigger frame; and incorporate a second part of the tone mapping information in the trigger frame as one or more signaling bits in a user information field that carries information specific to a first dRU allocated to a first STA.

Clause 36. The wireless communication device of any one of clauses 20-35, where the at least one processor is configured to: signal the tone mapping information in a combination of a plurality of signaling fields of the trigger frame corresponding to a plurality of subchannels of the wireless channel, puncturing information and uplink (UL) PPDU bandwidth information regarding the TB PPDU such that the first spreading bandwidth design is derivable from the combination of the plurality of signaling fields, the puncturing information and the UL PPDU bandwidth information.

Clause 37. The wireless communication device of any one of clauses 20-36, further including: the at least one modem configured to obtain a distributed transmission from a first STA via a first dRU of the one or more dRUs; and the at least one processor is configured to demap the distributed transmission to recover the TB PPDU from the first STA, the demapped distributed transmission include a number (N) of noncontiguous tones spanning a first spreading bandwidth in accordance with the first spreading bandwidth design.

Clause 38. The wireless communication device of any one of clauses 20-37, further including: at least one memory communicatively coupled with the at least one processor and storing processor-readable code; at least one transceiver coupled to the at least one modem; at least one antenna coupled to the at least one transceiver to wirelessly transmit signals output from the at least one transceiver and to wirelessly receive signals for input into the at least one transceiver; and a housing that encompasses the at least one modem, the at least one processor, the at least one memory, the at least one transceiver and at least a portion of the at least one antenna.

Clause 39. A method for wireless communication by a first wireless station (STA), including: receiving, from an access point, a trigger frame soliciting a trigger-based (TB) physical layer convergence protocol (PLCP) protocol data unit (PPDU) from a plurality of wireless stations (STAs) via a plurality of resource units (RUs), respectively, the trigger frame carrying RU allocation information indicating the plurality of RUs including one or more distributed RUs (dRUs) and carrying tone mapping information indicating at least a first spreading bandwidth design for the one or more dRUs; and identifying a first dRU in the RU allocation information that is allocated for the first STA, the first dRU associated with a first spreading bandwidth in accordance with the first spreading bandwidth design; mapping the first dRU to a number (N) of noncontiguous tones spanning the first spreading bandwidth; and transmitting the TB PPDU via the wireless channel as a distributed transmission over the N noncontiguous tones.

Clause 40. The method of clause 39, where the tone mapping information includes: one or more signaling bits that explicitly indicate the first spreading bandwidth design, or one or more information fields that implicitly indicate the first spreading bandwidth design based on a combination of a dRU indication bit, puncturing information and a PPDU bandwidth associated with the TB PPDU.

Clause 41. The method of any one of clauses 39-40, where the trigger frame carries the tone mapping information in a plurality of signaling fields corresponding to a plurality of subchannels of the wireless channel, each signaling field including a value to indicate whether RU allocations for a respective subchannel are regular RUs (rRUs) or dRUs, where the value further indicates a respective spreading bandwidth design for the respective subchannel in instances that the RU allocations for the respective subchannel are dRUs.

Clause 42. The method of any one of clauses 39-41, where: the RU allocation information indicates the first dRU is allocated for the first STA in a first subchannel, and a first signaling field indicates the first spreading bandwidth design for the first subchannel.

Clause 43. The method of any one of clauses 39-42, where: the tone mapping information includes a PPDU bandwidth of the TB PPDU, the first spreading bandwidth design includes a single spreading bandwidth that is equal to the PPDU bandwidth in instances that the PPDU bandwidth is less than 80 MHz bandwidth or the PPDU bandwidth is 80 MHz bandwidth and there is no puncturing in TB PPDU, and the first spreading bandwidth design is limited to 80 MHz bandwidth within each 80 MHz subchannel in instances that the PPDU bandwidth is greater than 80 MHz bandwidth.

Clause 44. The method of any one of clauses 39-43, further including: obtaining the tone mapping information from a plurality of signaling fields in the trigger frame, each signaling field associated with a respective 80 MHz bandwidth subchannel for the wireless channel and carrying a value selected from a group consisting of: a first value indicating that RU allocations for the respective 80 MHz subchannel are associated with a contiguous tone mapping, a second value indicating that RU allocations for the respective 80 MHz subchannel are associated with distributed tone mapping and further indicating a spreading bandwidth design that includes a single 80 MHz spreading bandwidth, and a third value indicating that RU allocations for the respective 80 MHz subchannel are associated with distributed tone mapping and further indicating a spreading bandwidth design that includes a single 40 MHz spreading bandwidth.

Clause 45. The method of any one of clauses 39-44, further including: obtaining the tone mapping information from a plurality of signaling fields in the trigger frame, each signaling field associated with a respective 80 MHz bandwidth subchannel for the wireless channel and carrying a value selected from a group consisting of: a first value indicating that RU allocations for the respective 80 MHz subchannel are associated with a contiguous tone mapping, a second value indicating that RU allocations for the respective 80 MHz subchannel are associated with distributed tone mapping and further indicating a spreading bandwidth design that includes a single 80 MHz spreading bandwidth, a third value indicating that RU allocations for the respective 80 MHz subchannel are associated with distributed tone mapping and further indicating a spreading bandwidth design that includes a single 40 MHz spreading bandwidth, a fourth value indicating that RU allocations for the respective 80 MHz subchannel are associated with distributed tone mapping and further indicating a spreading bandwidth design that includes a 20 MHz spreading bandwidth within a lower 40 MHz bandwidth portion of the respective 80 MHz subchannel and a 40 MHz spreading bandwidth within an upper 40 MHz bandwidth portion of the respective 80 MHz subchannel, a fifth value indicating that RU allocations for the respective 80 MHz subchannel are associated with distributed tone mapping and further indicating a spreading bandwidth design that includes a 40 MHz spreading bandwidth within the lower 40 MHz bandwidth portion of the respective 80 MHz subchannel and a 20 MHz spreading bandwidth within the upper 40 MHz bandwidth portion of the respective 80 MHz subchannel, and a sixth value indicating that RU allocations for the TB PPDU are associated with distributed tone mapping and further indicating a spreading bandwidth design that includes a single 20 MHz spreading bandwidth.

Clause 46. The method of any one of clauses 39-45, where a PPDU bandwidth for the TB PPDU is 20 MHz bandwidth or 40 MHz bandwidth, the method further including: obtaining the tone mapping information from a signal field in the trigger frame carrying a value selected from a group consisting of: a first value indicating that RU allocations for the TB PPDU are associated with a contiguous tone mapping, a second value indicating that RU allocations for the TB PPDU are associated with distributed tone mapping and further indicating a spreading bandwidth design that includes a single 20 MHz spreading bandwidth, and a third value indicating that RU allocations for the TB PPDU are associated with distributed tone mapping and further indicating a spreading bandwidth design that includes a single 40 MHz spreading bandwidth.

Clause 47. The method of any one of clauses 39-46, further including: obtaining all or part of the tone mapping information from one or more signaling bits in a common information field or a special user information field of the trigger frame that carry information common to multiple STAs having dRUs allocated in the trigger frame.

Clause 48. The method of any one of clauses 39-47, further including: obtaining a first part of the tone mapping information from one or more signaling bits in a common information field of the trigger frame; and obtaining a second part of the tone mapping information from one or more signaling bits in a special user information field of the trigger frame.

Clause 49. The method of any one of clauses 39-48, further including: obtaining, from at least a first signaling bit in a common information field or a first special user information field of the trigger frame, an indication that the trigger frame includes a second special user information field; and obtaining all or part of the tone mapping information from the second special user information field.

Clause 50. The method of any one of clauses 39-49, further including: obtaining all or part of the tone mapping information from one or more signaling bits in a user information field that carries information specific to a first dRU allocated to a first STA.

Clause 51. The method of any one of clauses 39-50, further including: obtaining a first part of the tone mapping information from one or more signaling bits in a common information field or a special user information field of the trigger frame; and obtaining a second part of the tone mapping information from one or more signaling bits in a user information field that carries information specific to a first dRU allocated to a first STA.

Clause 52. The method of any one of clauses 39-51, where generating the trigger frame includes: obtaining the tone mapping information from a combination of a plurality of signaling fields corresponding to a plurality of subchannels of the wireless channel, puncturing information and uplink (UL) PPDU bandwidth information regarding the TB PPDU; and deriving the first spreading bandwidth design based on the combination of the plurality of signaling fields, the puncturing information and the UL PPDU bandwidth information.

Clause 53. The method of any one of clauses 39-52, further including: obtaining a PPDU bandwidth associated with the TB PPDU from a bandwidth field of the trigger frame; and obtaining the first spreading bandwidth from tone mapping information in a special user information field of the trigger frame in instances that the PPDU bandwidth of the TB PPDU is 320 MHz bandwidth.

Clause 54. The method of any one of clauses 39-53, further including: identifying a regular RU (rRU) in a tone plan for contiguous transmissions, the rRU and the first dRU associated with a same logical RU in an RU allocation table; and identifying the first spreading bandwidth for the first dRU based on a location of the rRU in the tone plan in relation to one or more spreading bandwidths associated with the first spreading bandwidth design.

Clause 55. A wireless communication device of a first wireless station (STA), including: at least one modem configured to obtain, from an access point, a trigger frame soliciting a trigger-based (TB) physical layer convergence protocol (PLCP) protocol data unit (PPDU) from a plurality of wireless stations (STAs) via a plurality of resource units (RUs), respectively, the trigger frame carrying RU allocation information indicating the plurality of RUs including one or more distributed RUs (dRUs) and carrying tone mapping information indicating at least a first spreading bandwidth design for the one or more dRUs; at least one processor communicatively coupled with the at least one modem and configured to: identify a first dRU in the RU allocation information that is allocated for the first STA, the first dRU associated with a first spreading bandwidth in accordance with the first spreading bandwidth design, and map the first dRU to a number (N) of noncontiguous tones spanning the first spreading bandwidth; and the at least one modem configured to output the TB PPDU for a distributed transmission over the N noncontiguous tones of the wireless channel.

Clause 56. The wireless communication device of clause 55, where the tone mapping information includes: one or more signaling bits that explicitly indicate the first spreading bandwidth design, or one or more information fields that implicitly indicate the first spreading bandwidth design based on a combination of a dRU indication bit, puncturing information and a PPDU bandwidth associated with the TB PPDU.

Clause 57. The wireless communication device of any one of clauses 55-56, where the trigger frame carries the tone mapping information in a plurality of signaling fields corresponding to a plurality of subchannels of the wireless channel, each signaling field including a value to indicate whether RU allocations for a respective subchannel are regular RUs (rRUs) or dRUs, where the value further indicates a respective spreading bandwidth design for the respective subchannel in instances that the RU allocations for the respective subchannel are dRUs.

Clause 58. The wireless communication device of any one of clauses 55-57, where: the RU allocation information indicates the first dRU is allocated for the first STA in a first subchannel, and a first signaling field indicates the first spreading bandwidth design for the first subchannel.

Clause 59. The wireless communication device of any one of clauses 55-58, where: the tone mapping information includes a PPDU bandwidth of the TB PPDU, the first spreading bandwidth design includes a single spreading bandwidth that is equal to the PPDU bandwidth in instances that the PPDU bandwidth is less than 80 MHz bandwidth or the PPDU bandwidth is 80 MHz bandwidth and there is no puncturing in TB PPDU, and the first spreading bandwidth design is limited to 80 MHz bandwidth within each 80 MHz subchannel in instances that the PPDU bandwidth is greater than 80 MHz bandwidth.

Clause 60. The wireless communication device of any one of clauses 55-59, where the at least one processor is configured to: obtain the tone mapping information from a plurality of signaling fields in the trigger frame, each signaling field associated with a respective 80 MHz bandwidth subchannel for the wireless channel and carrying a value selected from a group consisting of: a first value indicating that RU allocations for the respective 80 MHz subchannel are associated with a contiguous tone mapping, a second value indicating that RU allocations for the respective 80 MHz subchannel are associated with distributed tone mapping and further indicating a spreading bandwidth design that includes a single 80 MHz spreading bandwidth, and a third value indicating that RU allocations for the respective 80 MHz subchannel are associated with distributed tone mapping and further indicating a spreading bandwidth design that includes a single 40 MHz spreading bandwidth.

Clause 61. The wireless communication device of any one of clauses 55-60, where the at least one processor is configured to: obtain the tone mapping information from a plurality of signaling fields in the trigger frame, each signaling field associated with a respective 80 MHz bandwidth subchannel for the wireless channel and carrying a value selected from a group consisting of: a first value indicating that RU allocations for the respective 80 MHz subchannel are associated with a contiguous tone mapping, a second value indicating that RU allocations for the respective 80 MHz subchannel are associated with distributed tone mapping and further indicating a spreading bandwidth design that includes a single 80 MHz spreading bandwidth, a third value indicating that RU allocations for the respective 80 MHz subchannel are associated with distributed tone mapping and further indicating a spreading bandwidth design that includes a single 40 MHz spreading bandwidth, a fourth value indicating that RU allocations for the respective 80 MHz subchannel are associated with distributed tone mapping and further indicating a spreading bandwidth design that includes a 20 MHz spreading bandwidth within a lower 40 MHz bandwidth portion of the respective 80 MHz subchannel and a 40 MHz spreading bandwidth within an upper 40 MHz bandwidth portion of the respective 80 MHz subchannel, a fifth value indicating that RU allocations for the respective 80 MHz subchannel are associated with distributed tone mapping and further indicating a spreading bandwidth design that includes a 40 MHz spreading bandwidth within the lower 40 MHz bandwidth portion of the respective 80 MHz subchannel and a 20 MHz spreading bandwidth within the upper 40 MHz bandwidth portion of the respective 80 MHz subchannel, and a sixth value indicating that RU allocations for the TB PPDU are associated with distributed tone mapping and further indicating a spreading bandwidth design that includes a single 20 MHz spreading bandwidth.

Clause 62. The wireless communication device of any one of clauses 55-61, where a PPDU bandwidth for the TB PPDU is 20 MHz bandwidth or 40 MHz bandwidth, and where the at least one processor is configured to: obtain the tone mapping information from a signal field in the trigger frame carrying a value selected from a group consisting of: a first value indicating that RU allocations for the TB PPDU are associated with a contiguous tone mapping, a second value indicating that RU allocations for the TB PPDU are associated with distributed tone mapping and further indicating a spreading bandwidth design that includes a single 20 MHz spreading bandwidth, and a third value indicating that RU allocations for the TB PPDU are associated with distributed tone mapping and further indicating a spreading bandwidth design that includes a single 40 MHz spreading bandwidth.

Clause 63. The wireless communication device of any one of clauses 55-62, where the at least one processor is configured to: obtain all or part of the tone mapping information from one or more signaling bits in a common information field or a special user information field of the trigger frame that carry information common to multiple STAs having dRUs allocated in the trigger frame.

Clause 64. The wireless communication device of any one of clauses 55-63, where the at least one processor is configured to: obtain a first part of the tone mapping information from one or more signaling bits in a common information field of the trigger frame; and obtain a second part of the tone mapping information from one or more signaling bits in a special user information field of the trigger frame.

Clause 65. The wireless communication device of any one of clauses 55-64, where the at least one processor is configured to: obtain, from at least a first signaling bit in a common information field or a first special user information field of the trigger frame, an indication that the trigger frame includes a second special user information field; and obtain all or part of the tone mapping information from the second special user information field.

Clause 66. The wireless communication device of any one of clauses 55-65, where the at least one processor is configured to: obtain all or part of the tone mapping information from one or more signaling bits in a user information field that carries information specific to a first dRU allocated to a first STA.

Clause 67. The wireless communication device of any one of clauses 55-66, where the at least one processor is configured to: obtain a first part of the tone mapping information from one or more signaling bits in a common information field or a special user information field of the trigger frame; and obtain a second part of the tone mapping information from one or more signaling bits in a user information field that carries information specific to a first dRU allocated to a first STA.

Clause 68. The wireless communication device of any one of clauses 55-67, where the at least one processor is configured to: obtain the tone mapping information from a combination of a plurality of signaling fields corresponding to a plurality of subchannels of the wireless channel, puncturing information and uplink (UL) PPDU bandwidth information regarding the TB PPDU; and derive the first spreading bandwidth design based on the combination of the plurality of signaling fields, the puncturing information and the UL PPDU bandwidth information.

Clause 69. The wireless communication device of any one of clauses 55-68, where the at least one processor is configured to: obtain a PPDU bandwidth associated with the TB PPDU from a bandwidth field of the trigger frame; and obtain the first spreading bandwidth from tone mapping information in a special user information field of the trigger frame in instances that the PPDU bandwidth of the TB PPDU is 320 MHz bandwidth.

Clause 70. The wireless communication device of any one of clauses 55-69, where the at least one processor is configured to: identify a regular RU (rRU) in a tone plan for contiguous transmissions, the rRU and the first dRU associated with a same logical RU in an RU allocation table; and identify the first spreading bandwidth for the first dRU based on a location of the rRU in the tone plan in relation to one or more spreading bandwidths associated with the first spreading bandwidth design.

Clause 71. The wireless communication device of any one of clauses 55-70, further including: at least one memory communicatively coupled with the at least one processor and storing processor-readable code; at least one transceiver coupled to the at least one modem; at least one antenna coupled to the at least one transceiver to wirelessly transmit signals output from the at least one transceiver and to wirelessly receive signals for input into the at least one transceiver; and a housing that encompasses the at least one modem, the at least one processor, the at least one memory, the at least one transceiver and at least a portion of the at least one antenna.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by an access point (AP), comprising:
 allocating a plurality of resource units (RUs) of a wireless channel to a plurality of wireless stations (STAs), respectively, for a trigger-based (TB) physical layer convergence protocol (PLCP) protocol data unit (PPDU), the plurality of RUs including one or more distributed RUs (dRUs); and
 transmitting, via the wireless channel to the plurality of wireless STAs, a trigger frame comprising one or more first fields associated with RU allocation information indicating the plurality of RUs and comprising one or more second fields associated with tone mapping information indicating at least a first spreading bandwidth design for the one or more dRUs, the one or more dRUs being mapped to respective sets of noncontiguous tones in accordance with the first spreading bandwidth design.

2. The method of claim 1, wherein the tone mapping information includes:
 a plurality of signaling bits corresponding to a plurality of subchannels of the wireless channel, each signaling bit indicating whether RU allocations for a respective subchannel are regular RUs (rRUs) or dRUs, and
 one or more signaling fields indicating a respective spreading bandwidth design for a particular subchannel in instances that the RU allocations for the particular subchannel are dRUs.

3. The method of claim 1, further comprising:
 signaling the tone mapping information in a plurality of signaling fields of the trigger frame corresponding to a plurality of subchannels of the wireless channel, each signaling field including a value to indicate whether RU allocations for a respective subchannel are regular RUs (rRUs) or dRUs, the value further indicating a respective spreading bandwidth design for the respective subchannel in instances that the RU allocations for the respective subchannel are dRUs.

4. The method of claim 1, further comprising:
 selecting the first spreading bandwidth design, from among a plurality of spreading bandwidth design options, to cause the TB PPDU to exclude a punctured portion of the wireless channel; and
 allocating the one or more dRUs in accordance with respective locations of corresponding rRUs in a contiguous tone map such that the one or more dRUs are mapped to respective spreading bandwidths that exclude the punctured portion of the wireless channel.

5. The method of claim 1, further comprising:
 setting a PPDU bandwidth of the TB PPDU;
 selecting the first spreading bandwidth design, from among a plurality of spreading bandwidth design options, in accordance with the PPDU bandwidth; and
 signaling the PPDU bandwidth of the TB PPDU in the trigger frame, the tone mapping information being associated with the PPDU bandwidth.

6. The method of claim 5, wherein:
 the first spreading bandwidth design includes a single spreading bandwidth that is equal to the PPDU bandwidth in instances that the PPDU bandwidth is less than 80 MHz bandwidth or the PPDU bandwidth is 80 MHz bandwidth and there is no puncturing in TB PPDU, and
 the first spreading bandwidth design is limited to 80 MHz bandwidth within each 80 MHz subchannel in instances that the PPDU bandwidth is greater than 80 MHz bandwidth.

7. The method of claim 1, further comprising:
 signaling the tone mapping information in a plurality of signaling fields of the trigger frame, each signaling field associated with a respective 80 MHz bandwidth subchannel for the wireless channel; and
 populating each signal field with a value selected from a group consisting of:
  a first value indicating that RU allocations for the respective 80 MHz subchannel are associated with a contiguous tone mapping,
  a second value indicating that RU allocations for the respective 80 MHz subchannel are associated with distributed tone mapping and further indicating a spreading bandwidth design that includes a single 80 MHz spreading bandwidth, and
  a third value indicating that RU allocations for the respective 80 MHz subchannel are associated with distributed tone mapping and further indicating a spreading bandwidth design that includes a single 40 MHz spreading bandwidth.

8. The method of claim 1, further comprising:
 signaling the tone mapping information in a plurality of signaling fields of the trigger frame, each signaling field associated with a respective 80 MHz bandwidth subchannel for the wireless channel; and
 populating each signal field with a value selected from a group consisting of:
  a first value indicating that RU allocations for the respective 80 MHz subchannel are associated with a contiguous tone mapping,
  a second value indicating that RU allocations for the respective 80 MHz subchannel are associated with distributed tone mapping and further indicating a spreading bandwidth design that includes a single 80 MHz spreading bandwidth,
  a third value indicating that RU allocations for the respective 80 MHz subchannel are associated with distributed tone mapping and further indicating a spreading bandwidth design that includes a single 40 MHz spreading bandwidth,
  a fourth value indicating that RU allocations for the respective 80 MHz subchannel are associated with distributed tone mapping and further indicating a spreading bandwidth design that includes a 20 MHz spreading bandwidth within a lower 40 MHz bandwidth portion of the respective 80 MHz subchannel and a 40 MHz spreading bandwidth within an upper 40 MHz bandwidth portion of the respective 80 MHz subchannel,
  a fifth value indicating that RU allocations for the respective 80 MHz subchannel are associated with distributed tone mapping and further indicating a spreading bandwidth design that includes a 40 MHz spreading bandwidth within the lower 40 MHz bandwidth portion of the respective 80 MHz subchannel and a 20 MHz spreading bandwidth within the upper 40 MHz bandwidth portion of the respective 80 MHz subchannel, and a sixth value indicating that RU allocations for the TB PPDU are associated with distributed tone mapping and further indicating a spreading bandwidth design that includes a single 20 MHz spreading bandwidth.

9. The method of claim 1, further comprising:
incorporating all or part of the tone mapping information in the trigger frame as one or more signaling bits in a common information field or a special user information field of the trigger frame that carry information common to multiple wireless STAs having dRUs allocated in the trigger frame.

10. The method of claim 1, further comprising:
incorporating a first part of the tone mapping information in the trigger frame as one or more signaling bits in a common information field of the trigger frame; and
incorporating a second part of the tone mapping information in the trigger frame as one or more signaling bits in a special user information field of the trigger frame.

11. The method of claim 1, further comprising:
indicating, by at least a first signaling bit in a common information field or a first special user information field of the trigger frame, that the trigger frame includes a second special user information field; and
incorporating all or part of the tone mapping information in the second special user information field.

12. The method of claim 1, further comprising:
incorporating all or part of the tone mapping information in the trigger frame as one or more signaling bits in a user information field that carries information specific to a first dRU allocated to a first wireless STA.

13. The method of claim 1, further comprising:
incorporating a first part of the tone mapping information in the trigger frame as one or more signaling bits in a common information field or a special user information field of the trigger frame; and
incorporating a second part of the tone mapping information in the trigger frame as one or more signaling bits in a user information field that carries information specific to a first dRU allocated to a first wireless STA.

14. The method of claim 1, wherein generating the trigger frame includes:
signaling the tone mapping information in a combination of a plurality of signaling fields corresponding to a plurality of subchannels of the wireless channel, puncturing information and uplink (UL) PPDU bandwidth information regarding the TB PPDU such that the first spreading bandwidth design is derivable from the combination of the plurality of signaling fields, the puncturing information and the UL PPDU bandwidth information.

15. The method of claim 1, wherein the one or more dRUs include at least a first dRU allocated for a first wireless STA of the plurality of wireless STAs, the method further comprising:
receiving a distributed transmission from the first wireless STA via the first dRU; and
demapping the distributed transmission to recover the TB PPDU from the first wireless STA, the demapped distributed transmission include a number (N) of noncontiguous tones spanning a first spreading bandwidth in accordance with the first spreading bandwidth design.

16. A wireless communication device for wireless communication at an access point, comprising:
at least one processor configured to allocate a plurality of resource units (RUs) of a wireless channel to a plurality of wireless stations (STAs), respectively, for a trigger-based (TB) physical layer convergence protocol (PLCP) protocol data unit (PPDU), the plurality of RUs including one or more distributed RUs (dRUs); and
at least one modem configured to output a trigger frame for transmission via the wireless channel to the plurality of wireless STAs, wherein the trigger frame comprises one or more first fields associated with RU allocation information indicating the plurality of RUs and comprises one or more second fields associated with tone mapping information indicating at least a first spreading bandwidth design for the one or more dRUs, the one or more dRUs being mapped to respective sets of noncontiguous tones in accordance with the first spreading bandwidth design.

17. The wireless communication device of claim 16, wherein the at least one processor is configured to:
signal the tone mapping information in a plurality of signaling fields of the trigger frame corresponding to a plurality of subchannels of the wireless channel, each signaling field including a value to indicate whether RU allocations for a respective subchannel are regular RUs (rRUs) or dRUs, the value further indicating a respective spreading bandwidth design for the respective subchannel in instances that the RU allocations for the respective subchannel are dRUs.

18. The wireless communication device of claim 16, further comprising:
the at least one modem configured to obtain a distributed transmission from a first wireless STA via a first dRU of the one or more dRUs; and
the at least one processor is configured to demap the distributed transmission to recover the TB PPDU from the first wireless STA, the demapped distributed transmission include a number (N) of noncontiguous tones spanning a first spreading bandwidth in accordance with the first spreading bandwidth design.

19. The wireless communication device of claim 16, further comprising:
at least one memory communicatively coupled with the at least one processor and storing processor-readable code;
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the at least one processor, the at least one memory, the at least one transceiver and at least a portion of the at least one antenna.

20. A method for wireless communication by a first wireless station (STA), comprising:
receiving, from an access point, a trigger frame soliciting a trigger-based (TB) physical layer convergence protocol (PLCP) protocol data unit (PPDU) from a plurality of wireless STAs via a plurality of resource units (RUs), respectively, the trigger frame comprising one or more first fields associated with RU allocation information indicating the plurality of RUs including one or more distributed RUs (dRUs) and comprising one or more second fields associated with tone mapping information indicating at least a first spreading bandwidth design for the one or more dRUs;
mapping a first dRU to a number (N) of noncontiguous tones spanning a first spreading bandwidth, the first dRU being in accordance with the RU allocation information allocated for the first wireless STA, and the first spreading bandwidth being in accordance with the first spreading bandwidth design; and
transmitting the TB PPDU via a wireless channel as a distributed transmission over the N noncontiguous tones.

21. The method of claim 20, wherein the tone mapping information includes:
one or more signaling bits that explicitly indicate the first spreading bandwidth design, or
one or more information fields that implicitly indicate the first spreading bandwidth design in accordance with a combination of a dRU indication bit, puncturing information and a PPDU bandwidth associated with the TB PPDU.

22. The method of claim 20, wherein:
the RU allocation information indicates the first dRU is allocated for the first wireless STA in a first subchannel, and
a first signaling field indicates the first spreading bandwidth design for the first subchannel.

23. The method of claim 20, further comprising:
obtaining all or part of the tone mapping information from one or more signaling bits in a common information field or a special user information field of the trigger frame that carry information common to multiple wireless STAs having dRUs allocated in the trigger frame.

24. The method of claim 20, further comprising:
obtaining a first part of the tone mapping information from one or more signaling bits in a common information field of the trigger frame; and
obtaining a second part of the tone mapping information from one or more signaling bits in a special user information field of the trigger frame.

25. The method of claim 20, further comprising:
obtaining a first part of the tone mapping information from one or more signaling bits in a common information field or a special user information field of the trigger frame; and
obtaining a second part of the tone mapping information from one or more signaling bits in a user information field that carries information specific to the first dRU allocated to the first wireless STA.

26. The method of claim 20, wherein generating the trigger frame includes:
obtaining the tone mapping information from a combination of a plurality of signaling fields corresponding to a plurality of subchannels of the wireless channel, puncturing information and uplink (UL) PPDU bandwidth information regarding the TB PPDU; and
deriving the first spreading bandwidth design in accordance with the combination of the plurality of signaling fields, the puncturing information and the UL PPDU bandwidth information.

27. The method of claim 20, wherein:
a regular RU (rRU) is identified in a tone plan for contiguous transmissions, the rRU and the first dRU associated with a same logical RU in an RU allocation table; and
the first spreading bandwidth for the first dRU is identified in accordance with a location of the rRU in the tone plan in relation to one or more spreading bandwidths associated with the first spreading bandwidth design.

28. A wireless communication device for wireless communication at a first wireless station (STA), comprising:
at least one modem configured to obtain, from an access point, a trigger frame soliciting a trigger-based (TB) physical layer convergence protocol (PLCP) protocol data unit (PPDU) from a plurality of wireless STA via a plurality of resource units (RUs), respectively, the trigger frame comprising one or more first fields associated with RU allocation information indicating the plurality of RUs including one or more distributed RUs (dRUs) and comprising one or more second fields associated with tone mapping information indicating at least a first spreading bandwidth design for the one or more dRUs;
at least one processor communicatively coupled with the at least one modem and configured to:
map a first dRU to a number (N) of noncontiguous tones spanning a first spreading bandwidth, the first dRU being in accordance with the RU allocation information, and the first spreading bandwidth being in accordance with the first spreading bandwidth design; and
the at least one modem configured to output the TB PPDU for a distributed transmission over the N noncontiguous tones of a wireless channel.

29. The wireless communication device of claim 28, wherein:
the RU allocation information indicates the first dRU is allocated for the first wireless STA in a first subchannel, and
a first signaling field indicates the first spreading bandwidth design for the first subchannel.

30. The wireless communication device of claim 28, further comprising:
at least one memory communicatively coupled with the at least one processor and storing processor-readable code;
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the at least one processor, the at least one memory, the at least one transceiver and at least a portion of the at least one antenna.

* * * * *